US007636347B2

(12) United States Patent
Ishii et al.

(10) Patent No.: US 7,636,347 B2
(45) Date of Patent: Dec. 22, 2009

(54) INTEGRATED RADIO COMMUNICATION SYSTEM, MOBILE COMMUNICATION SYSTEM, SWITCHING APPARATUS, RADIO TERMINAL, AND COMMUNICATION METHOD

(75) Inventors: Yoshikazu Ishii, Yokohama (JP); Tomoharu Kaneko, Yokohama (JP); Tsutomu Kito, Yokohama (JP)

(73) Assignee: Panasonic Corporation, Osaka (JP)

( * ) Notice: Subject to any disclaimer, the term of this patent is extended or adjusted under 35 U.S.C. 154(b) by 1257 days.

(21) Appl. No.: 10/502,936

(22) PCT Filed: Sep. 25, 2003

(86) PCT No.: PCT/JP03/12201

§ 371 (c)(1), (2), (4) Date: Jul. 29, 2004

(87) PCT Pub. No.: WO2004/032556

PCT Pub. Date: Apr. 15, 2004

(65) Prior Publication Data

US 2005/0085258 A1 Apr. 21, 2005

(30) Foreign Application Priority Data

Oct. 7, 2002 (JP) ............................. 2002-294196

(51) Int. Cl.
*H04L 12/56* (2006.01)

(52) U.S. Cl. .................... 370/352; 370/230.1; 370/235; 370/310; 370/312; 370/338; 455/426.1; 455/432.1; 455/552.1; 455/562.1

(58) Field of Classification Search ................ 370/389, 370/352, 230.1, 235, 310, 312, 338; 455/41.2, 455/422.1, 426.1, 432.1, 436, 552.1, 553.1, 455/562.1
See application file for complete search history.

(56) References Cited

U.S. PATENT DOCUMENTS

| 5,956,331 | A | 9/1999 | Rautiola et al. |
| 6,577,609 | B2* | 6/2003 | Sharony ..................... 370/312 |
| 6,643,522 | B1* | 11/2003 | Young ..................... 455/552.1 |
| 6,912,385 | B2 | 6/2005 | Namba et al. |
| 6,917,815 | B2* | 7/2005 | Hajimiri et al. .......... 455/552.1 |

(Continued)

FOREIGN PATENT DOCUMENTS

EP 1089587 4/2001

(Continued)

OTHER PUBLICATIONS

International Search Report dated Jan. 13, 2004.

(Continued)

*Primary Examiner*—Gerald Gauthier
(74) *Attorney, Agent, or Firm*—Dickinson Wright PLLC

(57) ABSTRACT

According to the present invention, in an integrated wireless communication system composed of a wireless LAN system 200 in which wireless communication is performed with mobile terminals 400 of a wireless LAN area 204, and a cellular system 100 that is linked to this wireless LAN system 200 via exchange equipment 300, a request from an external terminal for communication with a mobile terminal 400 or a request from a mobile terminal 400 for communication with an external terminal is received, and a communication path is selected and communication performed either via the cellular system 100 or via the wireless LAN system 200 according to this communication request.

48 Claims, 19 Drawing Sheets

U.S. PATENT DOCUMENTS

| | | | |
|---|---|---|---|
| 6,950,655 B2 * | 9/2005 | Hunkeler | 455/426.1 |
| 6,958,988 B1 | 10/2005 | Okagawa | |
| 7,082,320 B2 * | 7/2006 | Kattukaran et al. | 455/562.1 |
| 7,116,938 B2 * | 10/2006 | Monroe et al. | 455/41.2 |
| 7,133,669 B2 * | 11/2006 | Nair et al. | 455/432.1 |
| 7,174,165 B2 * | 2/2007 | Lee | 455/422.1 |
| 7,239,632 B2 * | 7/2007 | Kalavade et al. | 370/389 |
| 7,251,488 B2 * | 7/2007 | Chitrapu | 455/436 |
| 7,275,108 B2 | 9/2007 | Sakata | |
| 7,280,495 B1 * | 10/2007 | Zweig et al. | 370/312 |
| 7,298,724 B2 * | 11/2007 | Lin et al. | 370/338 |
| 7,313,104 B1 * | 12/2007 | Kern et al. | 370/310 |
| 7,319,687 B2 * | 1/2008 | Tsutsumi et al. | 370/338 |
| 7,339,892 B1 * | 3/2008 | Engwer et al. | 370/235 |
| 7,346,015 B2 * | 3/2008 | Shipman | 370/310 |
| 7,363,051 B2 * | 4/2008 | Bridgelall | 455/553.1 |
| 7,450,504 B1 * | 11/2008 | Ho et al. | 370/230.1 |
| 2002/0032024 A1 | 3/2002 | Namba et al. | |
| 2004/0204031 A1 * | 10/2004 | Kardach et al. | 455/552.1 |

FOREIGN PATENT DOCUMENTS

| | | |
|---|---|---|
| JP | 09130405 | 5/1997 |
| JP | 200295045 | 3/2002 |
| JP | 2002095045 | 3/2002 |
| JP | 2002176445 | 6/2002 |
| WO | 0076247 | 12/2000 |

OTHER PUBLICATIONS

Japanese Office Action dated May 15, 2007 with English translation thereof.

* cited by examiner

| USER ID | CELLULAR NETWORK NUMBER | CONTRACT INFORMATION |
|---|---|---|
| AAA | 090 − AAAA − BBBB | WIRELESS LAN SYSTEM A ONLY |
| BBB | 090 − BBBB − CCCC | WIRELESS LAN SYSTEMS A & B |
| CCC | 090 − CCCC − DDDD | NONE |
| DDD | 090 − DDDD − EEEE | |

INTEGRATED RADIO COMMUNICATION SYSTEM, MOBILE COMMUNICATION SYSTEM, SWITCHING APPARATUS, RADIO TERMINAL, AND COMMUNICATION METHOD

TECHNICAL FIELD

The present invention relates to an integrated wireless communication system that integrates a mobile communication system and a wireless LAN system.

BACKGROUND ART

Wireless communication systems currently in practical use can be broadly divided into two groups. One group comprises cellular wireless network systems (hereinafter referred to as "cellular systems") typified by GSM (Global System for Mobile Communications) and PDC (Personal Digital Cellular), and the other comprising wireless local area network systems (hereinafter referred to as "wireless LAN systems") typified by IEEE802.11a/b and HYPERLAN2.

In a cellular system, since mobile terminals have mobility, there are excellent management functions for related mobile terminal location information, and also excellent authentication functions necessary when a message service or encryption is implemented. In addition, this kind of system can be used across a wide range, and is effective as a voice communication system.

In a wireless LAN system, on the other hand, large-capacity data transmission can be achieved, with maximum data transmission capacities of 11 Mbps with IEEE802.11b, and 54 Mbps with IEEE802.11a and HYPERLAN2.

Also, data transmission systems that combine the above-described advantages of cellular systems and wireless LAN systems and avoid their shortcomings have been studied (for example, Unexamined Japanese Patent Publication No. HEI 9-130405 (pages 7-8, FIG. 1)).

However, in a cellular system, when a large number of users are in a communicating state and communication density is high, capacity problems occur even in the present situation, and there is also a problem of not being able to provide sufficient data transmission capacity for large-capacity data transmission expected henceforth.

With a wireless LAN system, on the other hand, there is a problem of inadequacy of mobile terminal location information management functions as provided in a cellular system.

Also, simple authentication between an access point and mobile terminal such as ESS-ID (Extended Service Set Identity) is used for authentication performed when a link is established with a mobile terminal, and encryption technology for improving wireless LAN security, such as the WEP (wired equivalent privacy) security specification supported by IEEE802.11, for example, is used.

With such simple authentication and WEP encryption technology, a key can easily be deciphered by deciphering and stealing secret key data and a MAC (Media Access Control) address from a received wireless signal. Therefore, bugging, masquerading, and suchlike activities are possible, and vulnerability in terms of security is demonstrated.

DISCLOSURE OF INVENTION

It is an object of the present invention to make it possible to perform wireless communication provided with a mobile terminal authentication function according to a cellular system and a large-capacity data transmission function according to a wireless LAN system.

According to the present invention, in an integrated wireless communication system composed of a wireless LAN system in which wireless communication is performed with mobile terminals of a wireless LAN area, and a mobile communication system that is linked to this wireless LAN system via exchange equipment that performs mutual information exchange therewith, a request for communication with a mobile terminal is received from an external terminal or a request for communication with an external terminal is received from a mobile terminal, and a communication path is selected and communication performed either via the mobile communication system or via the wireless LAN system according to this communication request.

By this means, since a communication path is selected and wireless communication performed either via a mobile communication system or via a wireless LAN system according to a communication request from an external terminal or mobile terminal, it is possible to perform wireless communication provided with a mobile terminal authentication function according to a mobile communication system and a large-capacity data transmission function according to a wireless LAN system.

BEST MODE FOR CARRYING OUT THE INVENTION

With reference now to the accompanying drawings, embodiments of the present invention will be explained in detail below.

Embodiment 1

Figure 1:
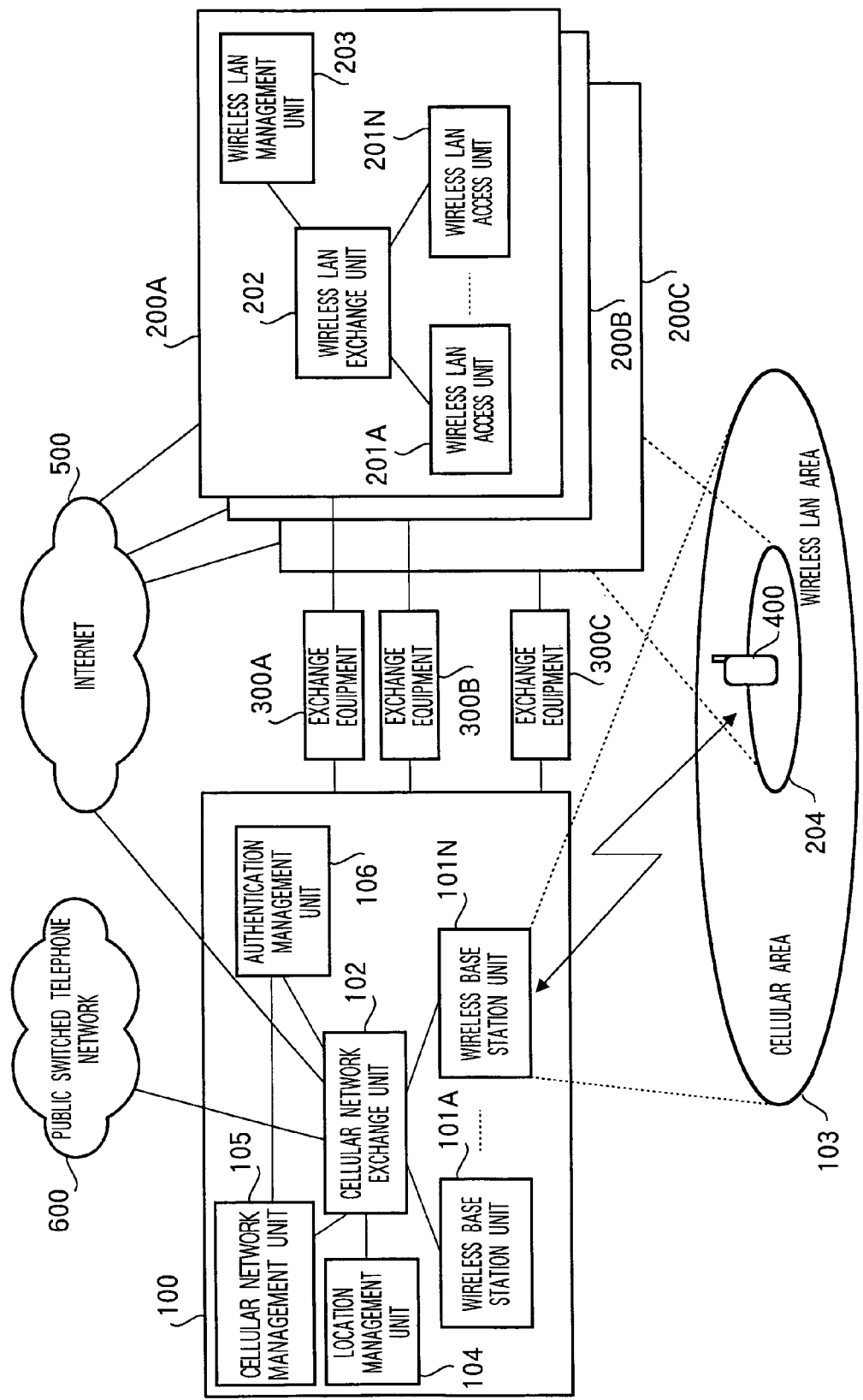
FIG. 1 is a block diagram showing the configuration of a network to which an integrated wireless communication system according to Embodiment 1 of the present invention is applied.

FIG. 1 is a block diagram showing the configuration of a network to which an integrated wireless communication system according to Embodiment 1 of the present invention is applied.

This integrated wireless communication system has a configuration such that a mobile communication system 100 and wireless local area network systems (hereinafter referred to as "wireless LAN systems") 200 are connected via exchange equipment 300. In this embodiment, a case is shown in which mobile communication system 100 is connected to a plurality of wireless LAN systems 200 via exchange equipment 300, but this is not a limitation, and this embodiment can also be applied to a case where a single wireless LAN system 200 is connected. In FIG. 1, a case is shown in which three wireless LAN systems 200A through 200C are connected to mobile communication system 100 via exchange equipment 300A through 300C respectively.

Also, in this embodiment, the use of a cellular wireless network system (hereinafter referred to as "cellular system") as mobile communication system 100 is described as an example, but this is not a limitation, and this embodiment can also be applied to another mobile communication system.

Cellular system 100 is provided with a plurality of wireless base station units 101a through 101N and a cellular network exchange unit 102. Each wireless base station unit 101 monitors access from a mobile terminal 400 located within a cellular area 103 as signed to itself.

Cellular network exchange unit 102 ascertains wireless base station unit 101 with which mobile terminal 400 is performing wireless communication, and establishes a call or session between the Internet 500 or public switched telephone network 600 and mobile terminal 400.

Figure 2:
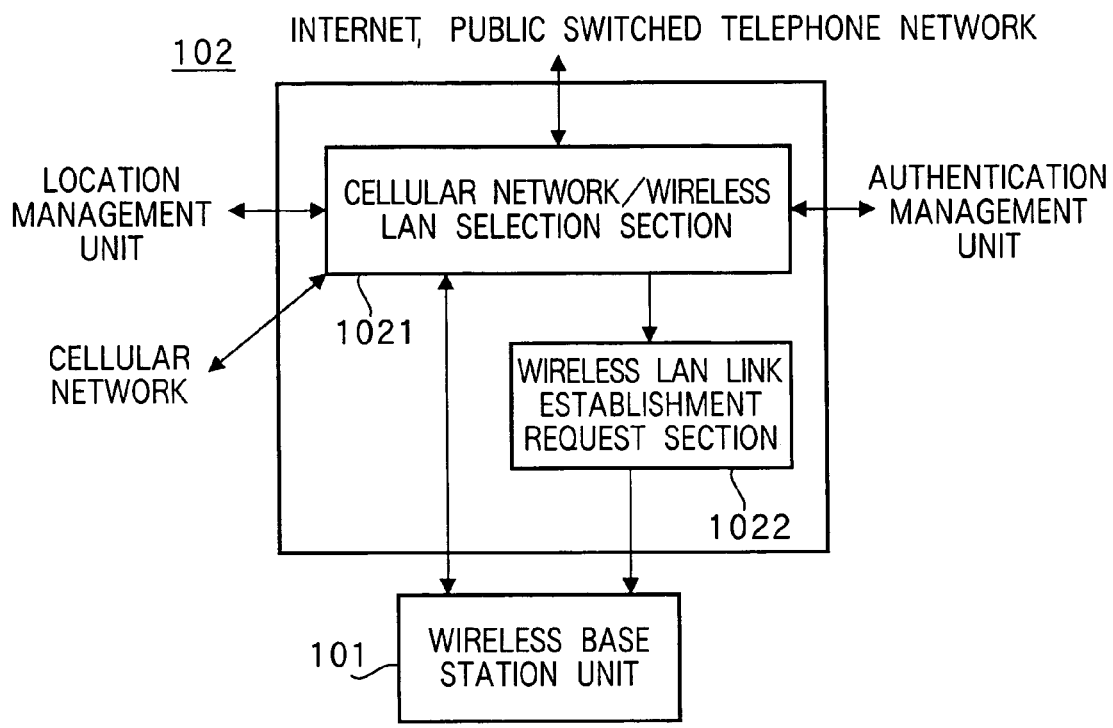
FIG. 2 is a block diagram showing the configuration that implements a function that selects a communication path of a cellular network exchange unit of a cellular system according to Embodiment 1.

Cellular network exchange unit 102 also has a function whereby, when information transmission is performed between an external terminal connected to the Internet 500 and mobile terminal 400, that communication path is selected from a communication path via cellular system 100 or a communication path via wireless LAN system 200. FIG. 2 is a block diagram showing the configuration that implements the function that selects a communication path of cellular network exchange unit 102.

When a communication path is to be selected, a cellular network/wireless LAN selection section 1021 selects a communication path via cellular system 100 or a communication path via wireless LAN system 200 according to an external terminal communication path request.

Cellular network/wireless LAN selection section 1021 selects one or other communication path according to the contents of a tag attached to a session establishment request signal from an external terminal. If this tag bears a request for a communication path via wireless LAN system 200, a communication path via wireless LAN system 200 is selected, and if the tag does not bear such a request, a communication path via cellular system 100 is selected.

When a communication path via wireless LAN system 200 is selected, and mobile terminal 400 has not established a link with wireless LAN system 200, a wireless LAN link establishment request section 1022 requests mobile terminal 400 to establish a link with wireless LAN system 200.

Figure 3:
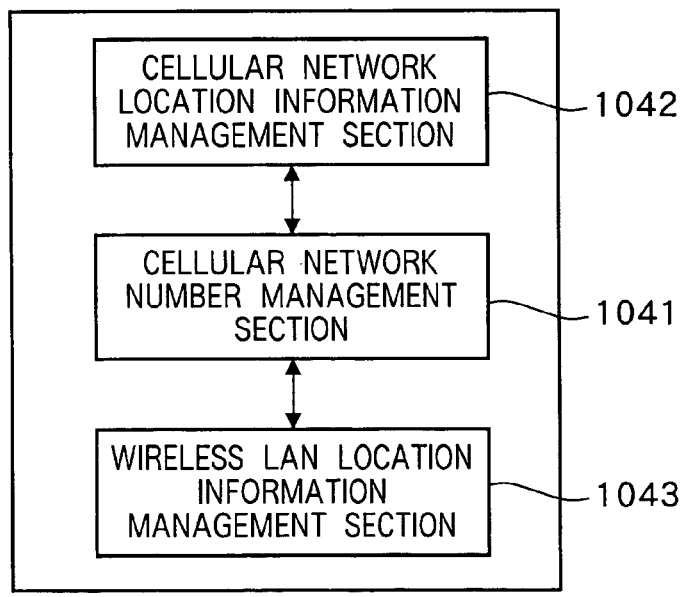
FIG. 3 is a block diagram showing the configuration of a location management unit of a cellular system according to Embodiment 1.

Cellular system 100 is also provided with a location management unit 104 that manages a telephone number (hereinafter referred to as "cellular network number") assigned to mobile terminal 400 under contract with cellular system 100, or location information (IP address as described later) of mobile terminal 400 in wireless LAN system 200. FIG. 3 is a block diagram showing the configuration of location management unit 104.

As shown in FIG. 3, location management unit 104 is provided with a cellular network number management section 1041 that manages cellular network numbers of users under contract with cellular system 100, a cellular network location information management section 1042 that manages location information of mobile terminal 400 in cellular area 103, and a wireless LAN location information management section 1043 that manages location information of mobile terminal 400 in wireless LAN system(s) 200 when mobile terminal 400 has established a link with one or a plurality of wireless LAN systems 200.

Wireless LAN location information management section 1043 manages the IP address assigned to mobile terminal 400 in wireless LAN system 200 as mobile terminal 400 location information.

Figures 4, 5:
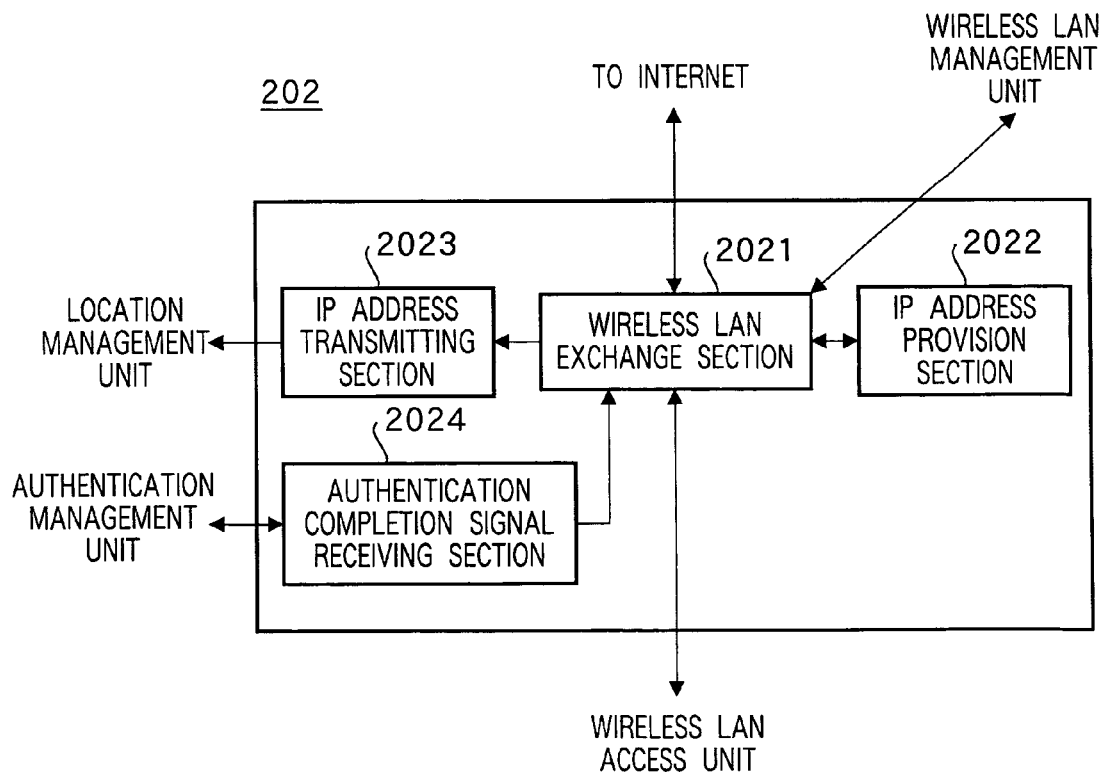
FIG. 4 is a drawing showing an example of information managed by a cellular network management unit of a cellular system according to Embodiment 1.
FIG. 5 is a block diagram showing the configuration of a wireless LAN exchange unit of a wireless LAN system according to Embodiment 1.

Cellular system 100 is also provided with a cellular network management unit 105 that manages user information such as the contractual status with respect to wireless LAN system 200 according to a mobile terminal 400 user. FIG. 4 shows an example of information managed by cellular network management unit 105.

As shown in FIG. 4, cellular network management unit 105 manages user IDs assigned to users under contract with cellular system 100, user-specific cellular network numbers, and contract information relating to use of wireless LAN system 200 by each user.

Registered contract information may specify, for example, a contract allowing connection only to cellular system 100 by a mobile terminal 400 user, a contract allowing connection not only to cellular system 100 but also to a wireless LAN system 200 in alliance with cellular system 100, or a contract allowing connection to a wireless LAN system 200 with which the user has a private contract.

Furthermore, cellular system 100 is provided with an authentication management unit 106 that performs authentication processing for a mobile terminal 400 in a wireless LAN system 200 in addition to authentication processing for a mobile terminal 400 in cellular system 100.

When performing authentication of a mobile terminal 400 in a wireless LAN system 200, authentication management unit 106 carries out authentication of that mobile terminal 400 in accordance with an authentication request from that mobile terminal 400. When authentication is completed, an authentication completion signal containing the user ID of the relevant mobile terminal 400 is transmitted via exchange equipment 300 to the wireless LAN system 200 with which mobile terminal 400 is attempting to establish a link. In wireless LAN system 200, final authentication of mobile terminal 400 is confirmed by comparing the mobile terminal 400 user ID contained in the link establishment request sent from mobile terminal 400 with the user ID received from authentication management unit 106. The authentication method of authentication management unit 106 is not limited to the above-described method, and another authentication method may be used.

Wireless LAN system 200A is provided with a plurality of wireless LAN access units 201A through 201N, a wireless LAN exchange unit 202, and a wireless LAN management unit 203. Other wireless LAN systems 200B and 200C have similar configurations to wireless LAN system 200A, and therefore descriptions thereof are omitted.

Each wireless LAN access unit 201 monitors access from mobile terminals 400 located within a wireless LAN area 204 assigned to the respective wireless LAN access unit 201.

Wireless LAN exchange unit 202 ascertains wireless LAN access unit 201 with which mobile terminal 400 is performing wireless communication, and establishes a session between the Internet 500 and mobile terminal 400.

Wireless LAN exchange unit 202 also performs processing necessary when mobile terminal 400 establishes a link with wireless LAN system 200. FIG. 5 is a block diagram showing the configuration of wireless LAN exchange unit 202.

In FIG. 5, a wireless LAN exchange section 2021 performs overall control of wireless LAN exchange unit 202, and performs information transmission between an external terminal connected to the Internet 500 and mobile terminal 400.

When there is a link establishment request from a mobile terminal 400, on completion of final authentication of mobile terminal 400, an IP address provision section 2022 assigns an IP address to that mobile terminal 400.

After a link with mobile terminal 400 is established, an IP address transmitting section 2023 reports the IP address to cellular system 100 via exchange equipment 300 as location information for mobile terminal 400 in wireless LAN system 200.

An authentication completion signal receiving section 2024 receives an authentication completion signal transmitted from authentication management unit 106 of cellular system 100. This authentication completion signal is passed to wireless LAN management unit 203 via wireless LAN exchange section 2021.

Wireless LAN management unit 203 manages user information on users under contract with wireless LAN system 200 and IP addresses assigned to mobile terminals 400. Wireless LAN management unit 203 also compares the user ID contained in an authentication completion signal reported from cellular system 100 with the user ID contained in a link establishment request from mobile terminal 400, and performs final authentication of mobile terminal 400.

Figure 6:
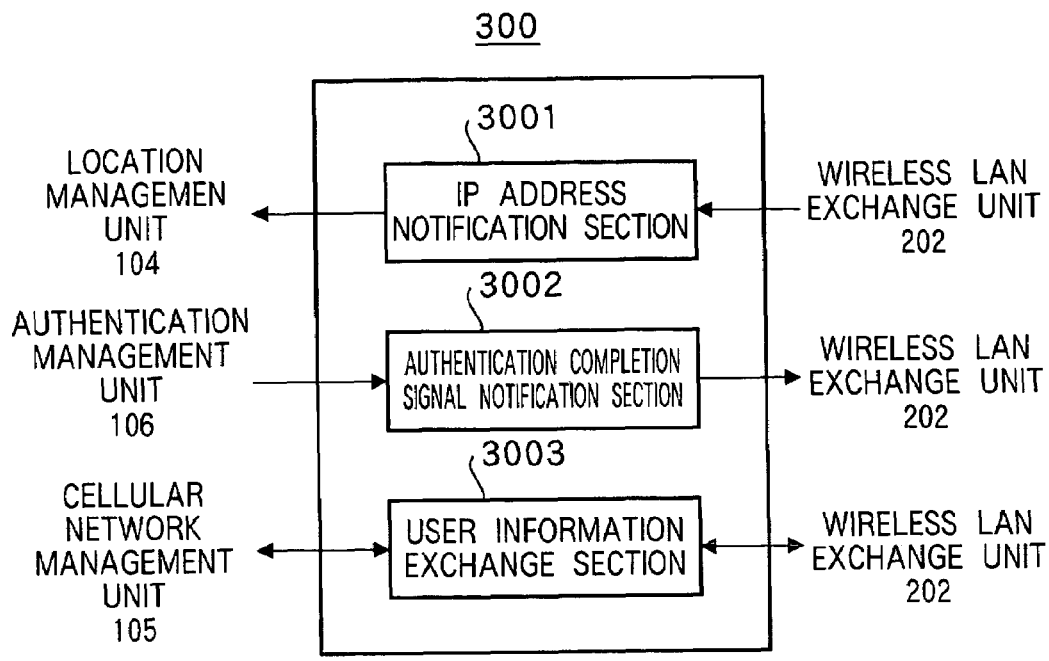
FIG. 6 is a block diagram showing the configuration of an exchange unit according to Embodiment 1.

Exchange equipment 300A is position between cellular system 100 and wireless LAN system 200A, and performs information exchange or notification between cellular system 100 and wireless LAN system 200A. Exchange equipments 300B and 300C have similar configurations to exchange equipment 300A, and therefore descriptions thereof are omitted. FIG. 6 is a block diagram showing the configuration of exchange equipment 300 in an integrated wireless communication system of this embodiment.

After a link has been established between mobile terminal 400 and wireless LAN system 200, IP address notification section 3001 in FIG. 6 receives the IP address assigned to mobile terminal 400 from wireless LAN exchange unit 202, and reports that IP address to location management unit 104 via cellular network exchange unit 102.

An authentication completion signal notification section 3002 receives from authentication management unit 106 the authentication completion signal sent from cellular system 100 in accordance with an authentication request at the time of link establishment between mobile terminal 400 and wireless LAN system 200, and reports the authentication completion signal to wireless LAN exchange unit 202.

A user information exchange section 3003 exchanges user information such as contract information between cellular system 100 and wireless LAN system 200. User information from wireless LAN system 200 is passed from wireless LAN exchange unit 202 to cellular network management unit 105. On the other hand, user information from cellular system 100 is passed from cellular network management unit 105 to wireless LAN exchange unit 202.

Figure 7:
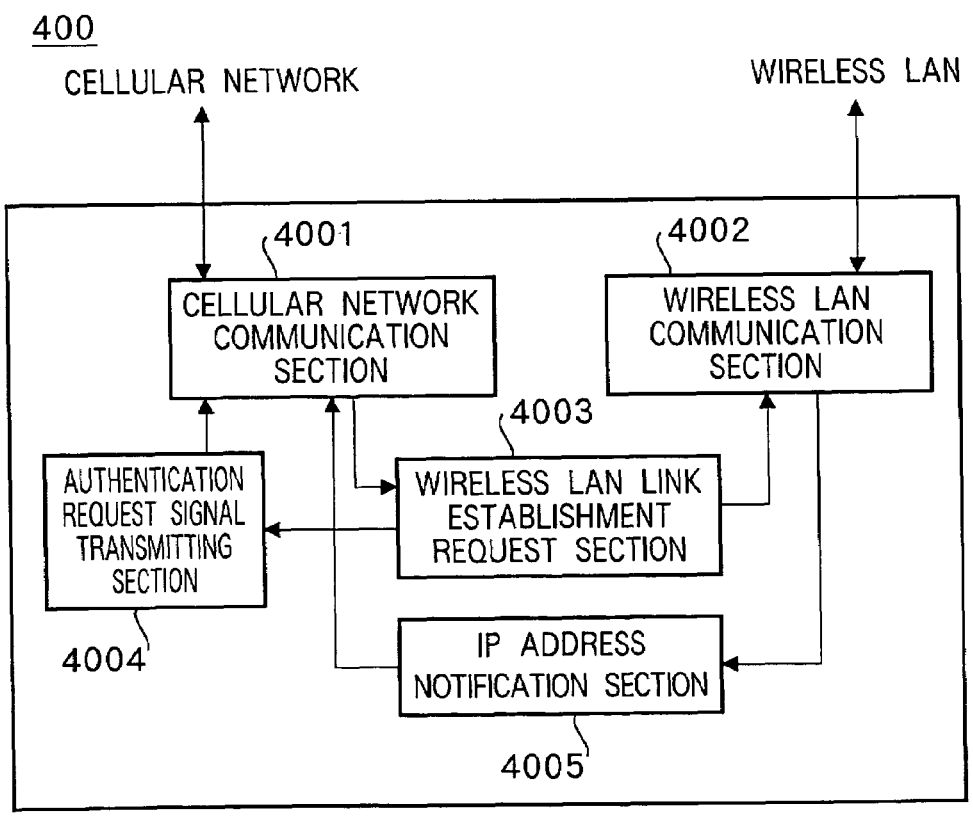
FIG. 7 is a block diagram showing the configuration of a mobile terminal according to Embodiment 1.

Mobile terminal 400 performs wireless communication with both cellular system 100 and wireless LAN system 200. FIG. 7 is a block diagram showing the configuration of mobile terminal 400.

In FIG. 7, a cellular network communication section 4001 establishes a link to cellular network exchange unit 102 (in FIG. 1, cellular network exchange unit 102N), and performs communication with cellular system 100.

A wireless LAN communication section 4002 establishes a link to wireless LAN access unit 201 (in FIG. 1, wireless LAN access unit 201A), and performs communication with wireless LAN system 200.

When a link is to be established with a wireless LAN system 200, a wireless LAN link establishment request section 4003 sends a link establishment request signal to the desired wireless LAN system 200 via wireless LAN communication section 4002.

An authentication request signal transmitting section 4004 transmits to cellular system 100, via cellular network communication section 4001, an authentication request signal to ask cellular system 100 for the authentication that is necessary when establishing a link with wireless LAN system 200.

After establishment of a link with wireless LAN system 200, an IP address notification section 4005 reports the IP address assigned from wireless LAN system 200 to location management unit 104 of cellular system 100 via cellular network communication section 4001.

Next, a description will be given of operations when information is transmitted to a mobile terminal 400 from an external terminal connected to the Internet 500 in an integrated wireless communication system according to Embodiment 1.

Figure 8:
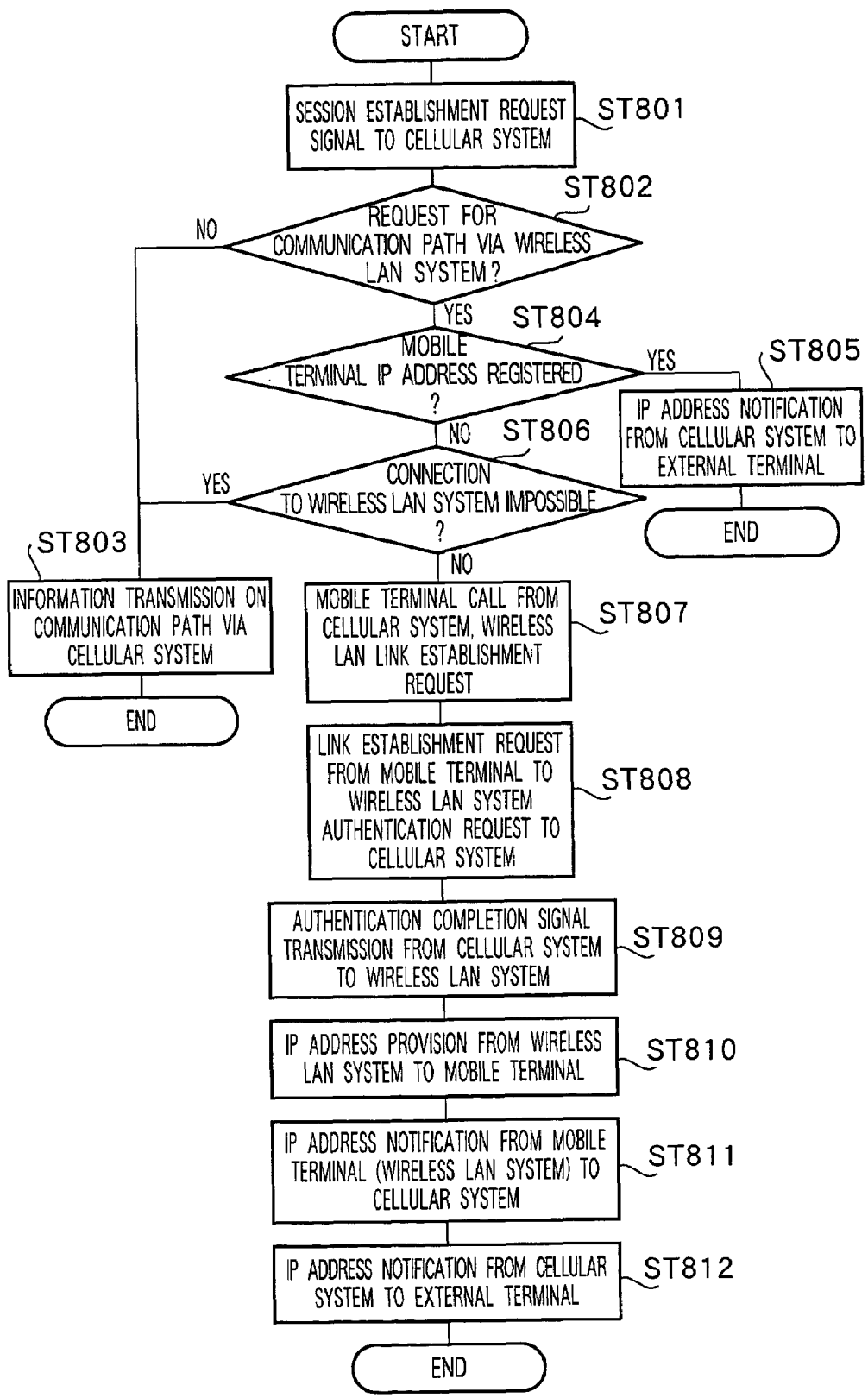
FIG. 8 is a flowchart of a case where information is transmitted to a mobile terminal from an external terminal connected to the Internet in an integrated wireless communication system according to Embodiment 1.

FIG. 8 is a flowchart of a case where information is transmitted to a mobile terminal 400 from an external terminal connected to the Internet 500 in an integrated wireless communication system according to Embodiment 1.

When information is transmitted to a mobile terminal 400 from an external terminal connected to the Internet 500, the external terminal first originates a call to mobile terminal 400 using a cellular network number. Together with this, a session establishment request signal is sent to cellular network exchange unit 102 of cellular system 100 (ST801).

When a session establishment request signal is received, cellular network/wireless LAN selection section 1021 of cellular network exchange unit 102 determines the contents of the tag attached to this session establishment request signal. Specifically, it is determined whether or not the session establishment request signal tag bears an indication to the effect that a communication path via wireless LAN system 200 is requested (ST802).

If there is no indication to the effect that a communication path via wireless LAN system 200 is requested, cellular network/wireless LAN selection section 1021 selects a communication path via cellular system 100.

In this case, cellular network exchange unit 102 confirms the location of mobile terminal 400 based on location information registered in cellular network location information management section 1042 of location management unit 104, and performs paging processing via wireless base station unit 101. After a link is established, information from the external terminal is transmitted to mobile terminal 400 (ST803).

On the other hand, if there is an indication to the effect that a communication path via wireless LAN system 200 is requested, it is determined whether mobile terminal 400 has established a link with any wireless LAN system 200. If mobile terminal 400 has established a link with a wireless LAN system 200, an IP address is registered in wireless LAN location information management section 1043 of location management unit 104 as described later herein. Therefore, cellular network/wireless LAN selection section 1021 determines whether the IP address of mobile terminal 400 is registered in wireless LAN location information management section 1043 of location management unit 104.

If the IP address is already registered, cellular network exchange unit 102 notifies the external terminal of the IP address assigned to mobile terminal 400 (ST805). On receiving the IP address notification, the external terminal again originates a call to this IP address, and after establishing a link with mobile terminal 400 via wireless LAN system 200, transmits information.

Here, a procedure has been shown whereby IP address notification is performed directly to the external terminal from cellular network exchange unit 102, but for IP address notification, it is usual for link establishment to be carried out via call control equipment of an ISP (Internet Service Provider). In this case, cellular network exchange unit 102 performs IP address notification to the call control equipment of the ISP.

On the other hand, if the IP address has not been registered, when a communication path via wireless LAN system 200 is selected, it is necessary to establish a link from wireless LAN system 200 to mobile terminal 400 and for an IP address to be assigned to mobile terminal 400 from wireless LAN system 200.

Here, link establishment between mobile terminal 400 and wireless LAN system 200 is performed according to the contents of a contract with the user of mobile terminal 400. That is to say, user contract contents may allow connection only to cellular system 100, or may allow connection not only to cellular system 100 but also to a wireless LAN system 200 in alliance with cellular system 100. In the former case, connection to a wireless LAN system 200 is not possible, and therefore a communication path via a wireless LAN system 200 cannot be selected.

Therefore, when the IP address has not been registered, cellular network/wireless LAN selection section 1021 confirms the mobile terminal 400 user's contract contents managed by cellular network management unit 105. Specifically, cellular network/wireless LAN selection section 1021 confirms whether or not the contract contents allow connection to a wireless LAN system 200 (ST806).

If the contract contents do not allow connection to a wireless LAN system 200, cellular network/wireless LAN selection section 1021 abandons a communication path via a wireless LAN system 200, shifts processing to ST803, selects a communication path via cellular system 100, and performs information transmission.

On the other hand, if the contract contents allow connection to a wireless LAN system 200, cellular network/wireless LAN selection section 1021 confirms the location of mobile terminal 400 based on the location information registered in cellular network location information management section 1042 of location management unit 104.

Wireless LAN link establishment request section 1022 calls mobile terminal 400 using a paging channel via wireless base station unit 101, and also reports information on a wireless LAN system 200 that can be used at the present location of mobile terminal 400, and requests link establishment with that wireless LAN system 200 (ST807). This information on a wireless LAN system 200 that can be used at the present location of mobile terminal 400 is selected from cellular network management unit 105 by cellular network/wireless LAN selection section 1021 based on present location information for mobile terminal 400.

Wireless LAN system 200 use information provided from cellular system 100 to mobile terminal 400 presupposes an alliance between cellular system 100 and wireless LAN system 200, and is realized by mutual sharing of use information via exchange equipment 300. Therefore, the service provision area will vary depending on which wireless LAN system 200 operators the operator of cellular system 100 is in alliance with, making it possible to achieve differentiation from operators of other cellular systems.

When this link establishment request is received, wireless LAN link establishment request section 4003 of mobile terminal 400 requests link establishment with a wireless LAN system 200 using reported use information concerning that wireless LAN system 200, and authentication request signal transmitting section 4004 transmits an authentication request signal to cellular system 100 (ST808). The link establishment request to wireless LAN system 200 contains the user ID of mobile terminal 400.

On receiving the link establishment request, wireless LAN system 200 must perform mobile terminal 400 authentication concerning link establishment. As stated above, in this integrated wireless communication system, this authentication is performed en bloc in cellular system 100.

That is to say, generally, in cellular system 100, an authentication management system is provided in which authentication management unit 106 carries out authentication using an encryption key and authentication key in line with the movements of mobile terminals 400. In this integrated wireless communication system, authentication of a mobile terminal 400 in a wireless LAN system 200 is performed using this authentication management system.

When an authentication request signal is received from a mobile terminal 400, authentication management unit 106 of cellular system 100 performs mobile terminal 400 authentication processing. Authentication is completed when it is confirmed that connection to wireless LAN system 200 is permitted based on the contents of the mobile terminal 400 user's contract.

When authentication is completed, authentication management unit 106 sends an authentication completion signal containing the user ID of the mobile terminal 400 user to wireless LAN system 200 via exchange equipment 300. The authentication completion signal is sent to authentication completion signal receiving section 2024 via authentication completion signal notification section 3002 of exchange equipment 300, and is passed from authentication completion signal receiving section 2024 to wireless LAN management unit 203.

On receiving the authentication completion signal, wireless LAN management unit 203 compares the user ID contained in the link establishment request with the user ID contained in this authentication completion signal, and confirms final authentication of mobile terminal 400.

When confirmation is completed as far as final authentication of mobile terminal 400, IP address provision section 2022 of wireless LAN exchange unit 202 assigns an IP address to mobile terminal 400 (ST810). By this means, a link is established between mobile terminal 400 and wireless LAN system 200. This IP address is reported to mobile terminal 400 via wireless LAN access unit 201.

When a link is established with mobile terminal 400, wireless LAN system 200 reports the IP address assigned to mobile terminal 400 to location management unit 104 of cellular system 100 (ST811). IP address notification from wireless LAN system 200 to cellular system 100 is performed via IP address notification section 3001 of exchange equipment 300. For notification of the IP address assigned to mobile terminal 400, a system may also be used whereby mobile terminal 400 notifies location management unit 104 of cellular system 100 directly.

When the IP address is reported, wireless LAN location information management section 1043 of location management unit 104 registers this IP address as corresponding to the cellular network number of mobile terminal 400.

Here, the IP address is reported from wireless LAN system 200 (mobile terminal 400) to cellular system 100 at fixed intervals while a link is established from mobile terminal 400 to wireless LAN system 200. Each time an IP address is reported, wireless LAN location information management section 1043 performs updating of that IP address. Then, when an IP address ceases to be reported at fixed intervals, wireless LAN location information management section 1043 deletes that IP address. Therefore, when mobile terminal 400 clears the link with wireless LAN system 200, its IP address is deleted.

By managing the IP address of a mobile terminal 400 in this way, location management unit 104 can constantly manage the link status between a mobile terminal 400 and wireless LAN system 200, and the latest IP address.

It is also possible for an IP address to be reported after mobile terminal 400 has established a link with wireless LAN system 200, and for the fact that mobile terminal 400 has cleared the link with wireless LAN system 200 to be reported after the event, and for IP address registration to be canceled upon notification of the fact that the link has been cleared.

When notification is performed only at the time of link establishment and link clearance in this way, the number of signal notifications while the link is established can be reduced compared with the case where an IP address is reported at fixed intervals. By this means it is possible to reduce the proportion of transmission path utilization associated with the transmission of control signals such as IP address notification signals.

When an IP address is registered, cellular network exchange unit 102 reports the IP address registered for mobile terminal 400 to the external terminal (ST812). On receiving notification of the IP address, the external terminal establishes a link with mobile terminal 400 via wireless LAN system 200 using this IP address, and transmits information.

Thus, according to an integrated wireless communication system of Embodiment 1, when information transmission is performed from an external terminal to mobile terminal 400, a communication path via cellular system 100 or a communication path via a wireless LAN system 200 is selected according to a communication path request from the external terminal. By this means, it is possible to perform wireless communication using communication paths via both systems.

Also, when wireless communication is performed using a communication path via a wireless LAN system 200, authentication of mobile terminal 400 is carried out using the authentication system of cellular system 100. By this means, authentication processing that has the same kind of high precision as authentication processing by cellular system 100 can be implemented by wireless LAN system 200. As a result, it is possible to perform wireless communication provided with a mobile terminal 400 authentication function in cellular system 100 and a large-capacity data transmission function in wireless LAN system 200.

In particular, in an integrated wireless communication system of Embodiment 1, the IP address of mobile terminal 400 that has established a link with wireless LAN system 200 is managed by cellular system 100. Then, when a communication path via wireless LAN system 200 is selected, the IP address of mobile terminal 400 is reported to an external terminal. By this means, the external terminal can perform wireless communication using a communication path via wireless LAN system 200 by again accessing the mobile terminal using this IP address.

Embodiment 2

When an integrated wireless communication system according to Embodiment 1 performs information transmission to a mobile terminal 400 from an external terminal, a communication path via cellular system 100 or a communication path via a wireless LAN system 200 is selected according to a communication path request from the external terminal. An integrated wireless communication system according to Embodiment 2 differs from an integrated wireless communication system according to Embodiment 1 in that a communication path is selected according to the data capacity of information for which there is a communication request from an external terminal.

In order to select a communication path according to the data capacity for which there is a communication request from an external terminal, an integrated wireless communication system according to Embodiment 2 has a function whereby, in cellular network exchange unit 102 of cellular system 100, cellular network/wireless LAN selection section 1021 determines the data capacity of information for which there is a communication request from an external terminal. The remaining configuration is similar to that of Embodiment 1, and therefore a description thereof is omitted.

Specifically, cellular network/wireless LAN selection section 1021 selects a communication path according to the data capacity entered on a tag attached to a session establishment request signal from an external terminal. At this time, if the data capacity is greater than a preset value (hereinafter referred to as "predetermined value"), a communication path via a wireless LAN system 200 is selected, and if the data capacity is less than or equal to the predetermined value, a communication path via cellular system 100 is selected.

Next, a description will be given of operations when information is transmitted to a mobile terminal 400 from an external terminal connected to the Internet 500 in an integrated wireless communication system according to Embodiment 2.

Figure 9:
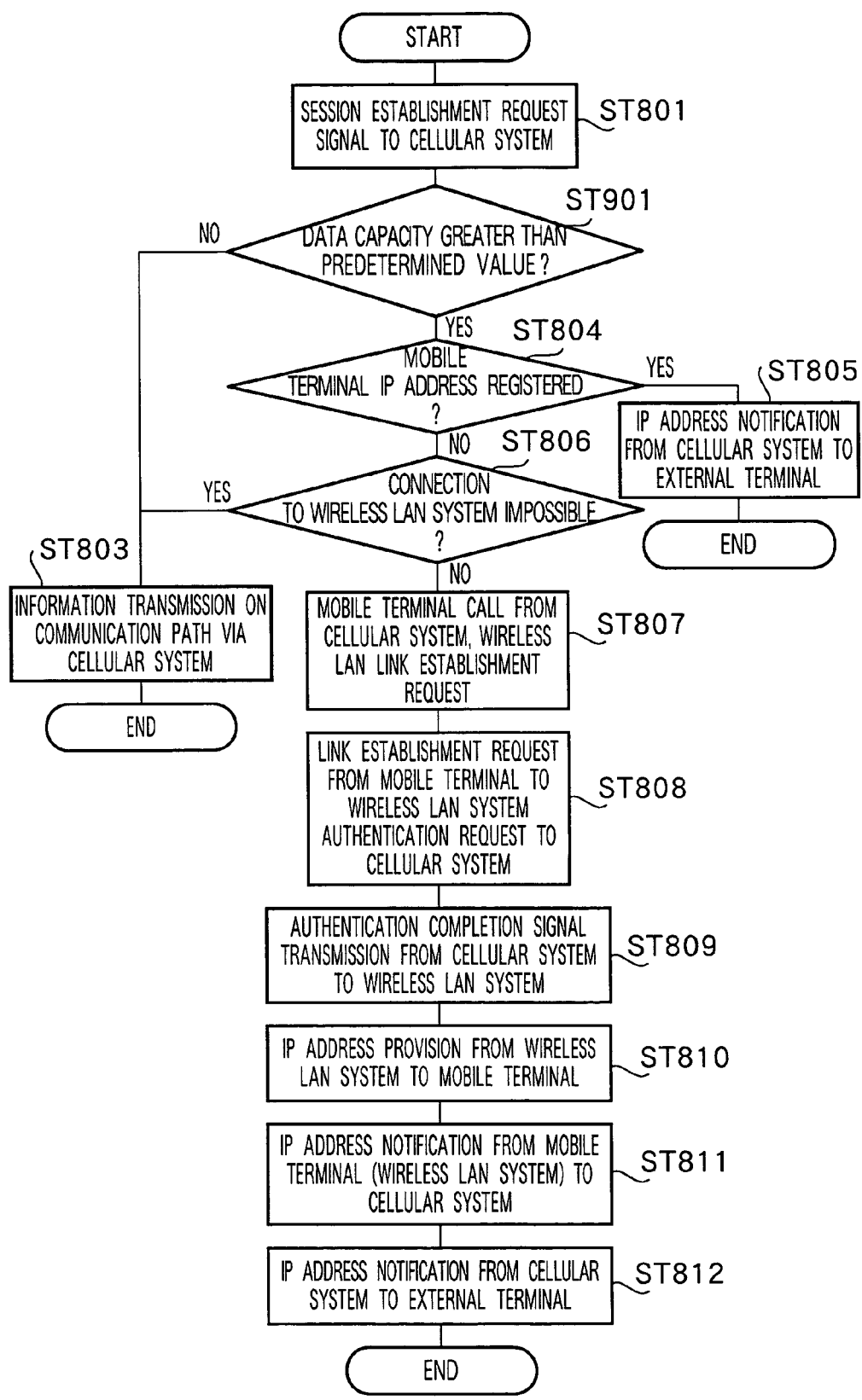
FIG. 9 is a flowchart of a case where information is transmitted to a mobile terminal from an external terminal connected to the Internet in an integrated wireless communication system according to Embodiment 2 of the present invention.

FIG. 9 is a flowchart of a case where information is transmitted to a mobile terminal 400 from an external terminal connected to the Internet 500 in an integrated wireless communication system according to Embodiment 2. Processing steps in FIG. 9 identical to processing steps shown in FIG. 8 are assigned the same codes as in FIG. 8, and descriptions thereof are omitted.

Processing in an integrated wireless communication system according to Embodiment 2 differs from that in an integrated wireless communication system according to Embodiment 1 only in the processing whereby a data capacity entered on a tag attached to a session establishment request signal sent from an external terminal is determined, and a communication path via cellular system 100 or a communication path via a wireless LAN system 200 is selected.

Specifically, the only difference is that when a session establishment request signal is received from an external terminal in ST801, cellular network/wireless LAN selection section 1021 of cellular network exchange unit 102 determines whether a data capacity entered on a tag attached to that session establishment request signal is greater than a predetermined value (ST901).

If the data capacity entered on the tag attached to the session establishment request signal is greater than the predetermined value, processing proceeds to ST804, a communication path via a wireless LAN system 200 is selected, and information transmission is performed. On the other hand, if the data capacity is less than or equal to the predetermined value, processing proceeds to ST803, a communication path via cellular system 100 is selected, and information transmission is performed.

Thus, according to an integrated wireless communication system of Embodiment 2, unlike an integrated wireless communication system of Embodiment 1, when information transmission is performed from an external terminal to a mobile terminal 400, a communication path via cellular system 100 or a communication path via a wireless LAN system 200 is selected according to the data capacity of information for which there is a communication request. Therefore, in addition to obtaining the effect of implementation of wireless communication provided with a mobile terminal 400 authentication function in cellular system 100 and a large-capacity data transmission function in a wireless LAN system 200, obtained in an integrated wireless communication system according to Embodiment 1, it is possible to select an appropriate communication path according to the data capacity of information for which there is a communication request from an external terminal, and transmit that information.

In the above description, a case has been described in which, when a communication path is selected, selection is performed according to the data capacity for which there is a communication request from an external terminal, but this is not a limitation. For example, communication path selection may be performed according to a transmission rate requested by an external terminal. In this case, also, the same kind of effect can be obtained as with an integrated wireless communication system according to Embodiment 2.

Embodiment 3

Whereas an integrated wireless communication system according to Embodiment 2 selects a communication path according to the data capacity of information for which there is a communication request from an external terminal, an integrated wireless communication system according to Embodiment 3 differs in selecting a communication path after assessing the wireless LAN congestion status in addition to the data capacity for which there is a communication request.

In order to assess the wireless LAN congestion status in addition to the data capacity for which there is a communication request from an external terminal, in an integrated wireless communication system according to Embodiment 3, cellular network exchange unit 102 of cellular system 100, wireless LAN exchange unit 202 of a wireless LAN system 200, and exchange equipment 300, have new configurations.

Figure 10:
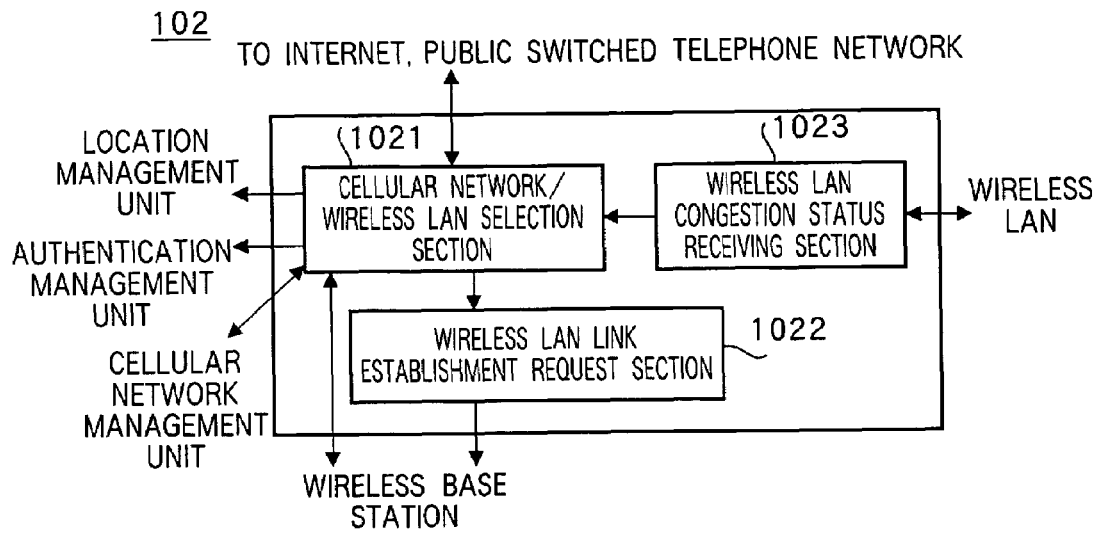
FIG. 10 is a block diagram showing the configuration of a cellular network exchange unit according to Embodiment 3.
Figure 11:
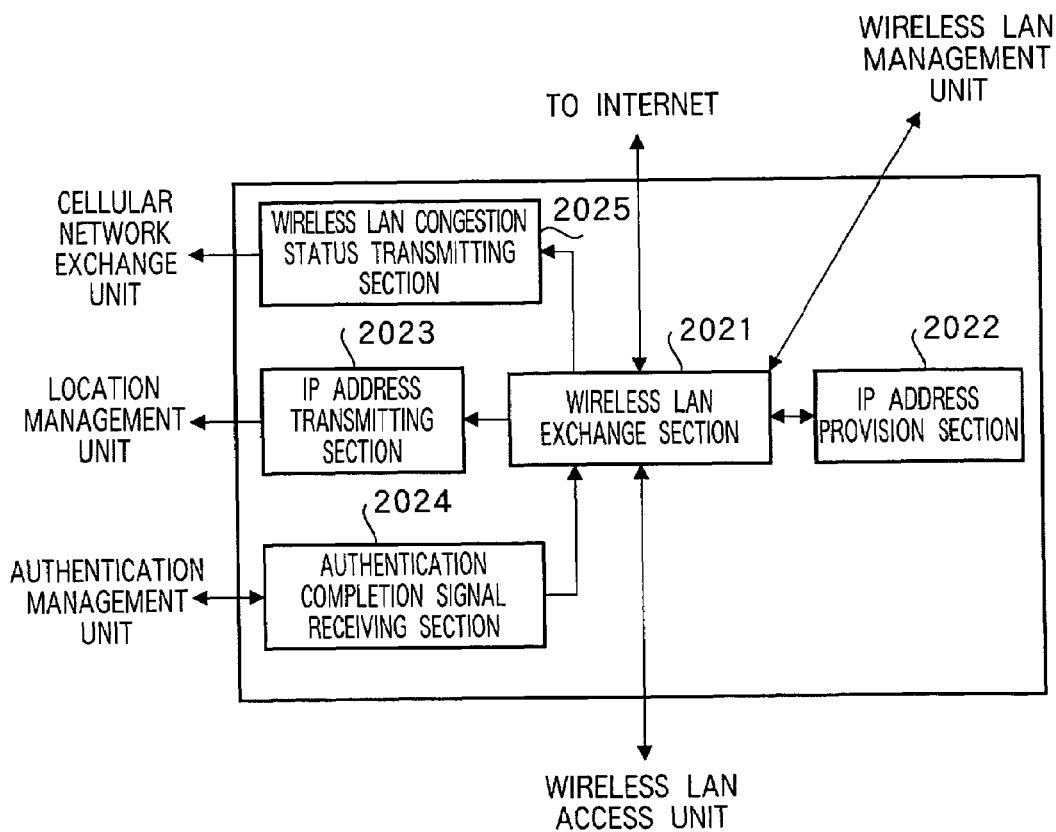
FIG. 11 is a block diagram showing the configuration of a wireless LAN exchange unit according to Embodiment 3.
Figure 12:
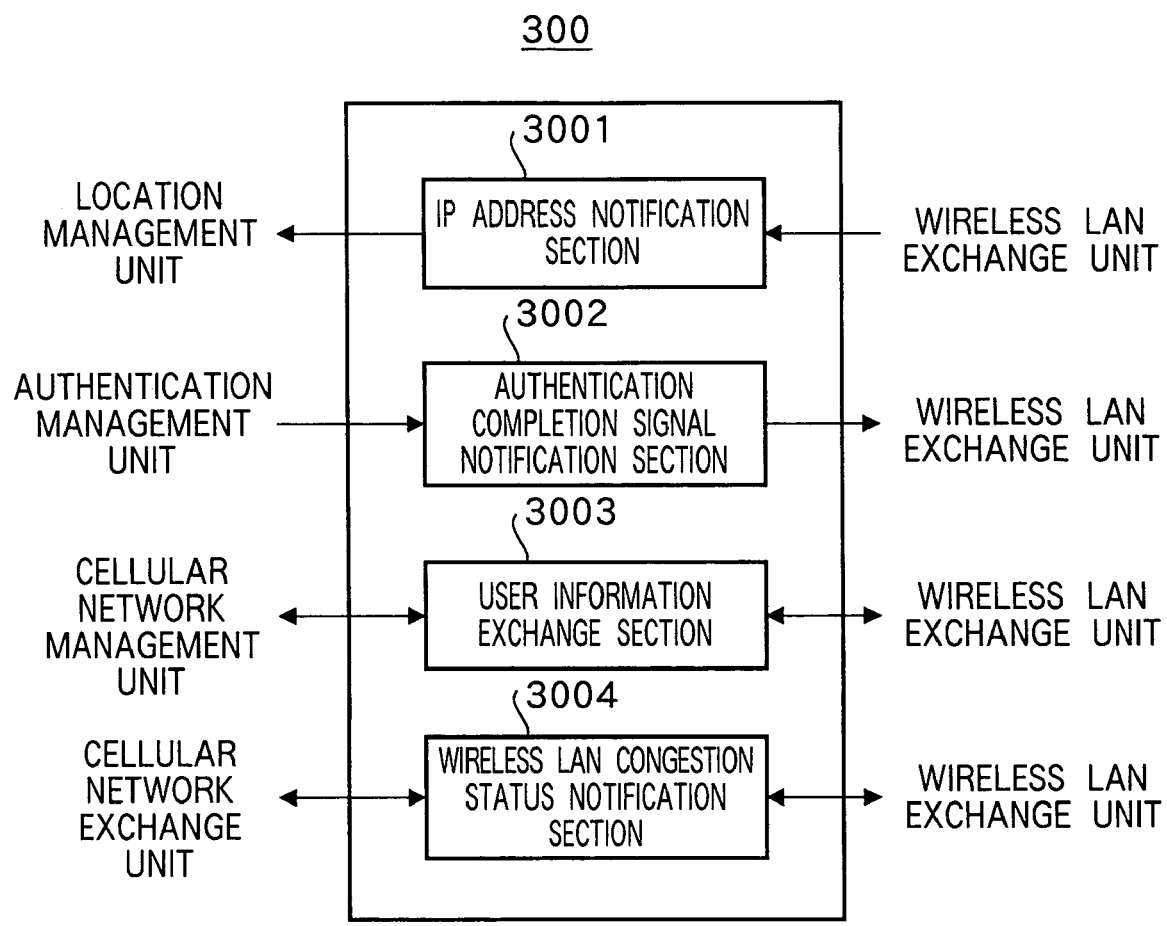
FIG. 12 is a block diagram showing the configuration of an exchange unit according to Embodiment 3.

FIG. 10 is a block diagram showing the configuration of a cellular network exchange unit 102 according to Embodiment 3, FIG. 11 is a block diagram showing the configuration of a wireless LAN exchange unit 202 according to Embodiment 3, and FIG. 12 is a block diagram showing the configuration of exchange equipment 300 according to Embodiment 3. Parts in FIG. 10, FIG. 11, and FIG. 12 identical to those in FIG. 2, FIG. 5, and FIG. 6 respectively are assigned the same codes as in FIG. 2, FIG. 5, and FIG. 6, and descriptions thereof are omitted.

As shown in FIG. 10, cellular network exchange unit 102 according to Embodiment 3 differs from cellular network exchange unit 102 according to Embodiment 2 in having a wireless LAN congestion status receiving section 1023, and in that cellular network/wireless LAN selection section 1021 assesses the wireless LAN congestion status when selecting a communication path according to the data capacity.

Also, as shown in FIG. 11, wireless LAN exchange unit 202 according to Embodiment 3 differs from wireless LAN exchange unit 202 according to Embodiment 2 in having a wireless LAN congestion status transmitting section 2025, and in that wireless LAN exchange section 2021 monitors the wireless LAN congestion status.

Furthermore, as shown in FIG. 12, exchange equipment 300 according to Embodiment 3 differs from exchange equipment 300 according to Embodiment 2 in having a wireless LAN congestion status notification section 3004.

That is to say, in an integrated wireless communication system according to Embodiment 3, the wireless LAN congestion status detected by wireless LAN exchange section 2021 is reported from wireless LAN congestion status transmitting section 2025 to wireless LAN congestion status receiving section 1023 via wireless LAN congestion status notification section 3004 of exchange equipment 300. A further difference from an integrated wireless communication system according to Embodiment 2 is that this wireless LAN congestion status is considered by cellular network/wireless LAN selection section 1021 when performing communication path selection. The remaining configuration is similar to that of Embodiment 2, and therefore a description thereof is omitted.

Next, a description will be given of operations when information is transmitted to a mobile terminal 400 from an external terminal connected to the Internet 500 in an integrated wireless communication system according to Embodiment 3.

Figure 13:
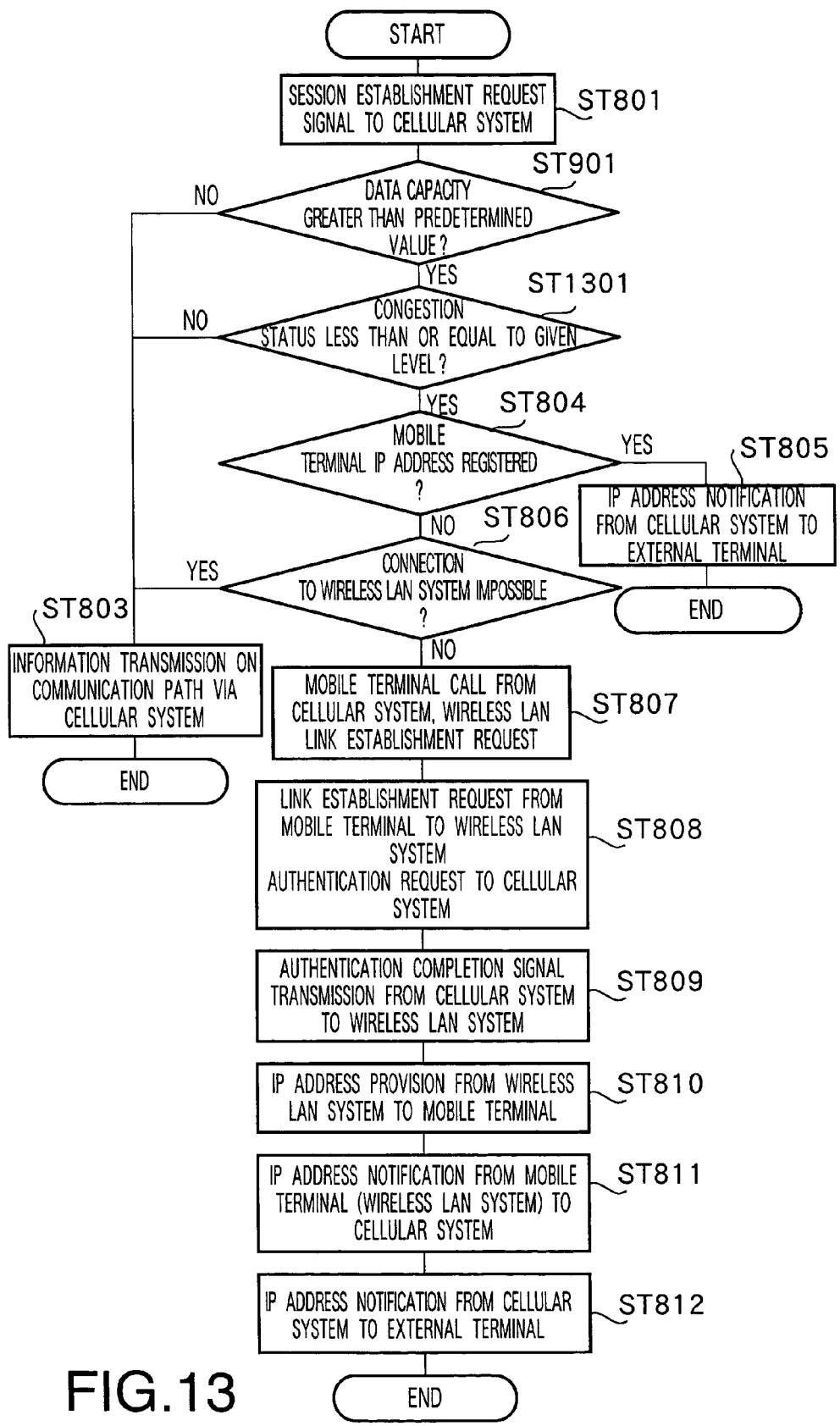
FIG. 13 is a flowchart of a case where information is transmitted to a mobile terminal from an external terminal connected to the Internet in an integrated wireless communication system according to Embodiment 3.

FIG. 13 is a flowchart of a case where information is transmitted to a mobile terminal 400 from an external terminal connected to the Internet 500 in an integrated wireless communication system according to Embodiment 3. Processing steps in FIG. 13 identical to processing steps shown in FIG. 9 are assigned the same codes as in FIG. 9, and descriptions thereof are omitted.

Processing in an integrated wireless communication system according to Embodiment 3 differs from that in an integrated wireless communication system according to Embodiment 2 only in the processing whereby the wireless LAN congestion status is assessed after a data capacity entered on a tag attached to a session establishment request signal sent from an external terminal is determined when a communication path is selected.

Specifically, the only difference is that when cellular network/wireless LAN selection section 1021 of cellular network exchange unit 102 determines in ST901 that a data capacity entered on a tag attached to a session establishment request signal from an external terminal is greater than a predetermined value, cellular network/wireless LAN selection section 1021 determines whether or not the wireless LAN congestion status is less than or equal to a given level (ST1301).

Then, if the wireless LAN congestion status is less than or equal to a given level, processing proceeds to ST804, a communication path via a wireless LAN system 200 is selected, and information transmission is performed. On the other hand, if the wireless LAN congestion status is greater than the given level, processing proceeds to ST803, a communication path via cellular system 100 is selected, and information transmission is performed.

Thus, according to an integrated wireless communication system of Embodiment 3, unlike an integrated wireless communication system of Embodiment 2, when information transmission is performed from an external terminal to a mobile terminal 400, a communication path via cellular system 100 or a communication path via a wireless LAN system 200 is selected according to the data capacity of information for which there is a communication request, and also, a communication path is selected taking the wireless LAN congestion status into consideration. Therefore, in addition to obtaining the effect of implementation of wireless communication provided with a mobile terminal 400 authentication function in cellular system 100 and a large-capacity data transmission function in a wireless LAN system 200, obtained in an integrated wireless communication system according to Embodiment 1 or 2, it is possible to select a communication path flexibly according to the network congestion status. As a result, it is possible to prevent dependably a state in which data is not transmitted to a mobile terminal 400 due to the wireless LAN congestion status.

In the above description, a case has been described in which only the congestion status of a wireless LAN system 200 is assessed in selecting a communication path, but this is not a limitation. It is also possible to assess the cellular network congestion status as well as the wireless LAN congestion status in selecting a communication path. In this case, a communication path via a wireless LAN system 200 can be selected even if the data capacity is small, enabling more efficient information transmission from an external terminal to be implemented.

Embodiment 4

Whereas integrated wireless communication systems according to Embodiments 1 through 3 cover only information from an external terminal to a mobile terminal 400, an integrated wireless communication system according to Embodiment 4 differs in that, in addition to provision of the functions of integrated wireless communication systems of Embodiments 1 through 3, a communication path via cellular system 100 or a communication path via a wireless LAN system 200 can also be selected when information is transmitted from a mobile terminal 400 to an external terminal. In an integrated wireless communication system according to Embodiment 4, mobile terminal 400 has a function that selects a communication path.

In order for a communication path to be selected by mobile terminal 400 when information is transmitted from mobile terminal 400, in an integrated wireless communication system according to Embodiment 4, mobile terminal 400 has a new configuration that selects a communication path.

Figure 14:
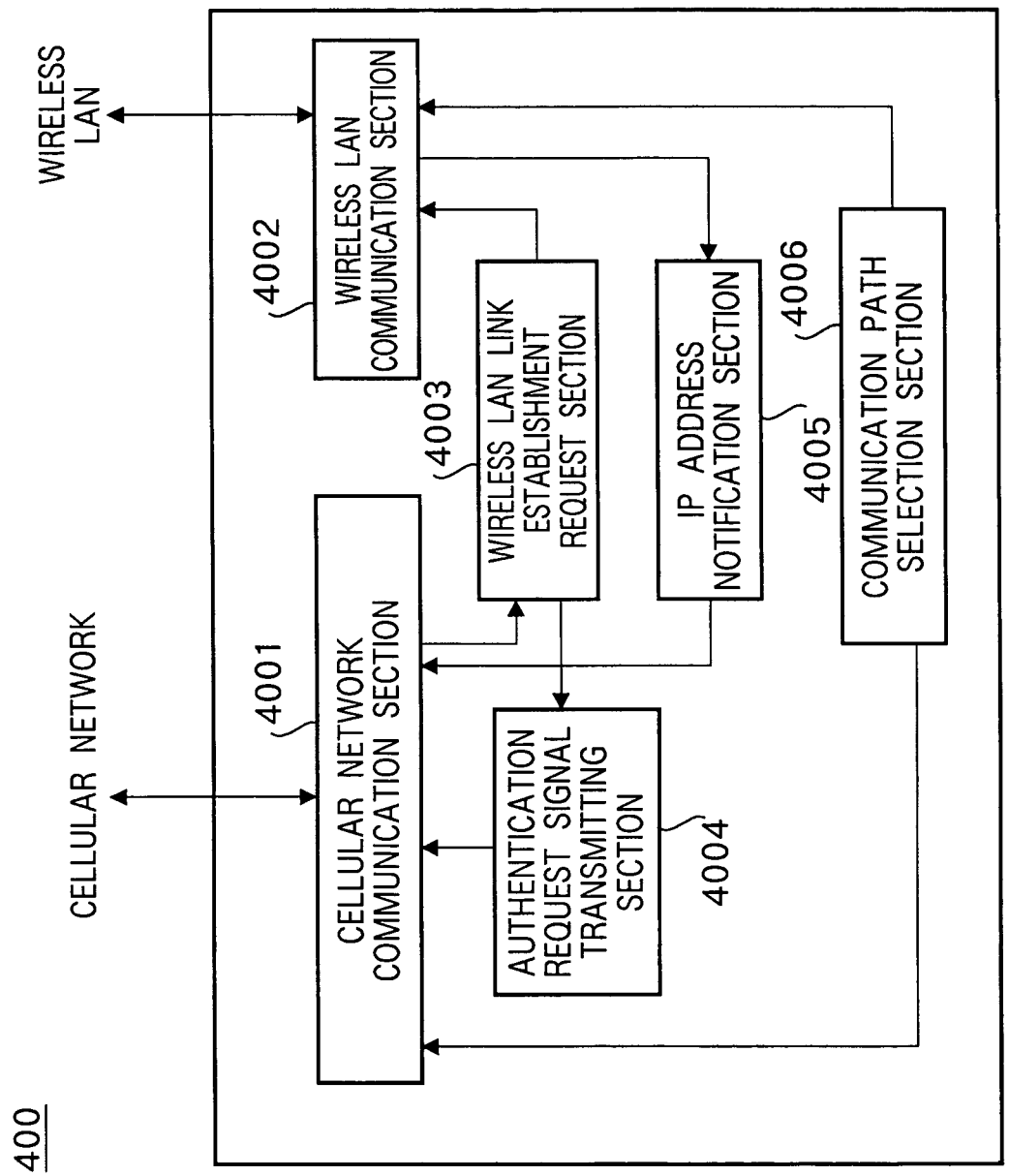
FIG. 14 is a block diagram showing the configuration of a mobile terminal according to Embodiment 4 of the present invention.

FIG. 14 is a block diagram showing the configuration of a mobile terminal 400 according to Embodiment 4. Parts in FIG. 14 identical to those in FIG. 7 are assigned the same codes as in FIG. 7 and descriptions thereof are omitted.

As shown in FIG. 14, a mobile terminal 400 according to Embodiment 4 differs from a mobile terminal 400 according to Embodiments 1 through 3 in having a communication path selection section 4006.

Communication path selection section 4006 selects a communication path according to a communication path request by a mobile terminal 400 user. Communication path selection section 4006 selects a communication path according to a communication path request made via an input section, etc., of mobile terminal 400.

Next, a description will be given of operations when information is transmitted from a mobile terminal 400 to an external terminal connected to the Internet 500 in an integrated wireless communication system according to Embodiment 4.

Figure 15:
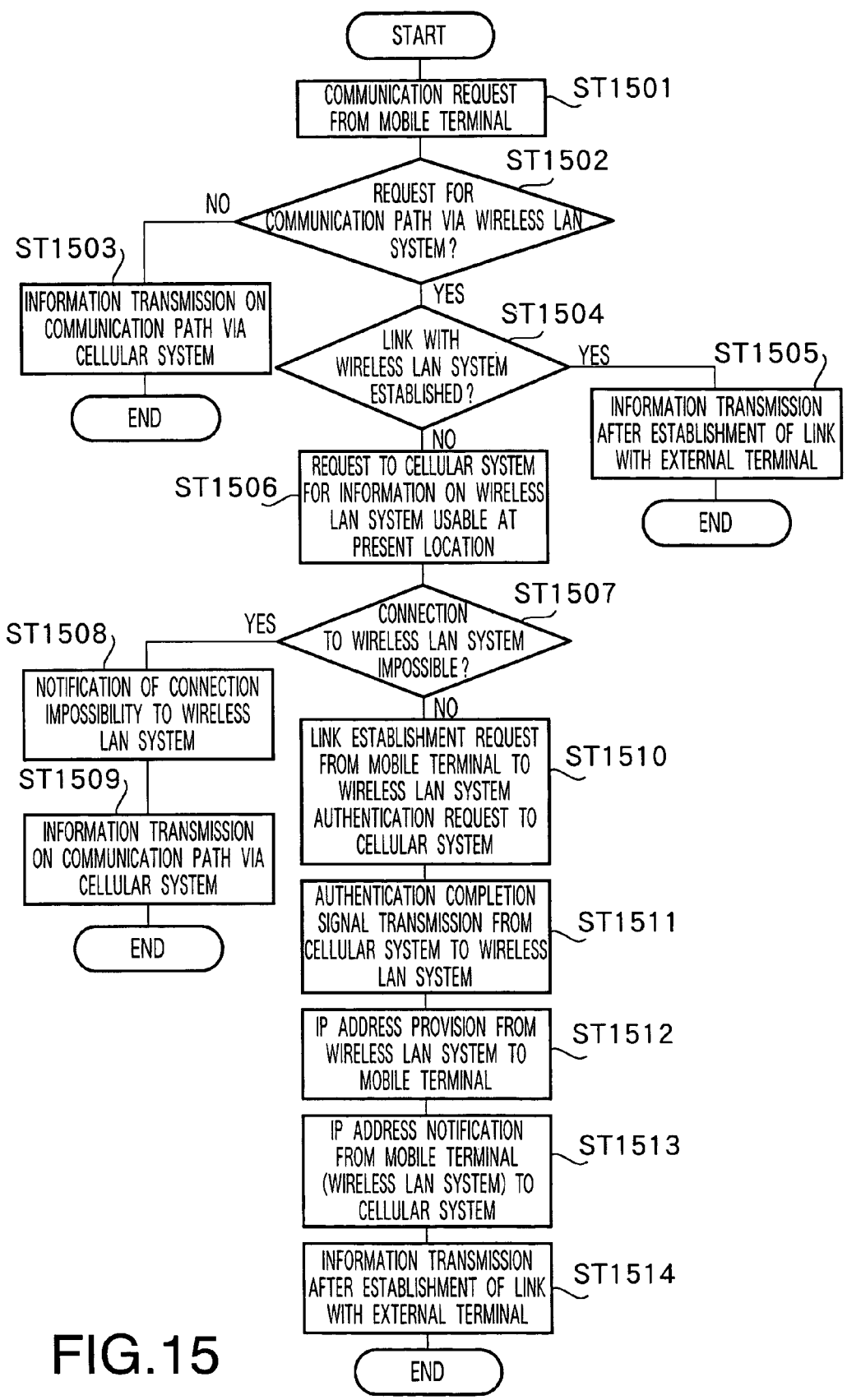
FIG. 15 is a flowchart of a case where information is transmitted from a mobile terminal to an external terminal connected to the Internet in an integrated wireless communication system according to Embodiment 4.

FIG. 15 is a flowchart of a case where information is transmitted from a mobile terminal 400 to an external terminal connected to the Internet 500 in an integrated wireless communication system according to Embodiment 4.

When information is transmitted from a mobile terminal 400 to an external terminal connected to the Internet 500, the mobile terminal 400 receives a communication request from a user (ST1501).

Communication path selection section 4006 determines whether a communication path is requested by the user in this communication request. Specifically, communication path selection section 4006 determines whether or not a communication path requested by the user is a communication path via a wireless LAN system 200 (ST1502).

If a communication path via a wireless LAN system 200 is not requested, communication path selection section 4006 selects a communication path via cellular system 100. Mobile terminal 400 calls an external terminal via a communication path via cellular system 100, and after establishing a link with the external terminal, transmits information specified by the user to the external terminal by means of cellular network communication section 4001 (ST1503).

If a communication path via a wireless LAN system 200 is requested, communication path selection section 4006 determines whether mobile terminal 400 has established a link with any wireless LAN system 200 (ST1504).

If a link has already been established with a wireless LAN system 200, mobile terminal 400 calls the address of the external terminal via a communication path via wireless LAN system 200, and after establishing a link with the external terminal, transmits information specified by the user to the external terminal by means of wireless LAN communication section 4002 (ST1505).

On the other hand, if a link has not been established with any wireless LAN system 200, communication path selection section 4006 requests information on a wireless LAN system 200 that can be used at the present location of mobile terminal 400 via cellular network communication section 4001 (ST1506).

On receiving this request, cellular network exchange unit 102 confirms the mobile terminal 400 user's contract contents managed by cellular network management unit 105. Specifically, cellular network exchange unit 102 confirms whether or not the contract contents allow connection to a wireless LAN system 200 (ST1507).

If the contract contents do not allow connection to a wireless LAN system 200, a signal indicating this fact is transmitted to mobile terminal 400 (ST1508). On receiving this signal, communication path selection section 4006 of mobile terminal 400 selects a communication path via cellular system 100. Mobile terminal 400 calls the external terminal via a communication path via cellular system 100, and after establishing a link with the external terminal, transmits information specified by the user to the external terminal by means of cellular network communication section 4001 (ST1509).

On the other hand, if the contract contents allow connection to a wireless LAN system 200, mobile terminal 400 location information managed by location management unit 104 is confirmed, and information on a wireless LAN system 200 that can be used by mobile terminal 400 according to that location information is reported to mobile terminal 400.

When this wireless LAN system 200 information is received, wireless LAN link establishment request section 4003 of mobile terminal 400 requests establishment of a link with the specified wireless LAN system 200, and authentication request signal transmitting section 4004 transmits an authentication request signal to cellular system 100 (ST1510). The wireless LAN system 200 link establishment request contains the user ID of mobile terminal 400.

When the authentication request signal is received, authentication management unit 106 of cellular system 100 performs mobile terminal 400 authentication processing. When authentication processing is completed, authentication management unit 106 sends an authentication completion signal containing the mobile terminal 400 user ID to wireless LAN system 200 via exchange equipment 300 (ST1511).

When the authentication completion signal is received, wireless LAN management unit 203 compares the user ID contained in the link establishment request with the user ID contained in this authentication completion signal, and confirms final authentication of mobile terminal 400.

When confirmation is completed as far as final authentication of mobile terminal 400, IP address provision section 2022 of wireless LAN exchange unit 202 assigns a mobile terminal 400 IP address (ST1512). By this means, a link is established between mobile terminal 400 and wireless LAN system 200. This IP address is reported to mobile terminal 400 via wireless LAN access unit 201.

On receiving IP address notification, mobile terminal 400 or wireless LAN system 200 reports the IP address assigned to mobile terminal 400 to location management unit 104 of cellular system 100 (ST1513). The reported IP address is registered in wireless LAN location information management section 1043 of location management unit 104 as corresponding to the cellular network number of mobile terminal 400.

After establishing a link with wireless LAN system 200, mobile terminal 400 calls the address of the external terminal via a communication path via wireless LAN system 200, and after a link is established with the external terminal, wireless LAN communication section 4002 transmits the information specified by the user to the external terminal (ST1514).

Thus, according to an integrated wireless communication system of Embodiment 4, when information transmission is performed from mobile terminal 400 to an external terminal, a communication path via cellular system 100 or a communication path via a wireless LAN system 200 is selected according to a communication path request from the mobile terminal 400 user. By this means, it is possible to perform wireless communication using communication paths via both systems.

Also, when wireless communication is performed using a communication path via a wireless LAN system 200, authentication of mobile terminal 400 is carried out using the authentication system of cellular system 100. By this means, authentication processing that has the same kind of high precision as authentication processing by cellular system 100 can be implemented by wireless LAN system 200. As a result, it is possible to perform wireless communication provided with a mobile terminal 400 authentication function in cellular system 100 and a large-capacity data transmission function in wireless LAN system 200.

In the above description, a case has been illustrated in which wireless LAN system 200 information is provided to mobile terminal 400 when there is a request from mobile terminal 400 for information on a wireless LAN system 200 that can be used at the present location. However, this is not a limitation, and it is also possible for information on a wireless LAN system 200 that can be used by mobile terminal 400 to be supplied by cellular system 100 constantly, and for this information to be used when establishing a link with a wireless LAN system 200. In this case, the process whereby usable wireless LAN system 200 information is requested by mobile terminal 400 can be omitted.

Embodiment 5

When an integrated wireless communication system according to Embodiment 4 performs information transmission from a mobile terminal 400 to an external terminal, a communication path via cellular system 100 or a communication path via a wireless LAN system 200 is selected according to a communication path request by mobile terminal 400. An integrated wireless communication system according to Embodiment 5 differs in that a communication path is selected according to the data capacity of information for which there is a communication request from mobile terminal 400. The remaining configuration is similar to that of Embodiment 4, and therefore a description thereof is omitted.

In order to select a communication path according to the data capacity for which there is a communication request from mobile terminal 400, in an integrated wireless communication system according to Embodiment 5, communication path selection section 4006 has a function whereby a communication path is selected after determining the data capacity of information for which there is a communication request from mobile terminal Specifically, communication path selection section 4006 selects a communication path according to the data capacity for which transmission is specified by mobile terminal 400. At this time, if the data capacity is greater than a preset value (hereinafter referred to as "predetermined value"), a communication path via a wireless LAN system 200 is selected, and if the data capacity is less than or equal to the predetermined value, a communication path via cellular system 100 is selected.

Next, a description will be given of operations when information is transmitted from a mobile terminal 400 to an external terminal connected to the Internet 500 in an integrated wireless communication system according to Embodiment 5.

Figure 16:
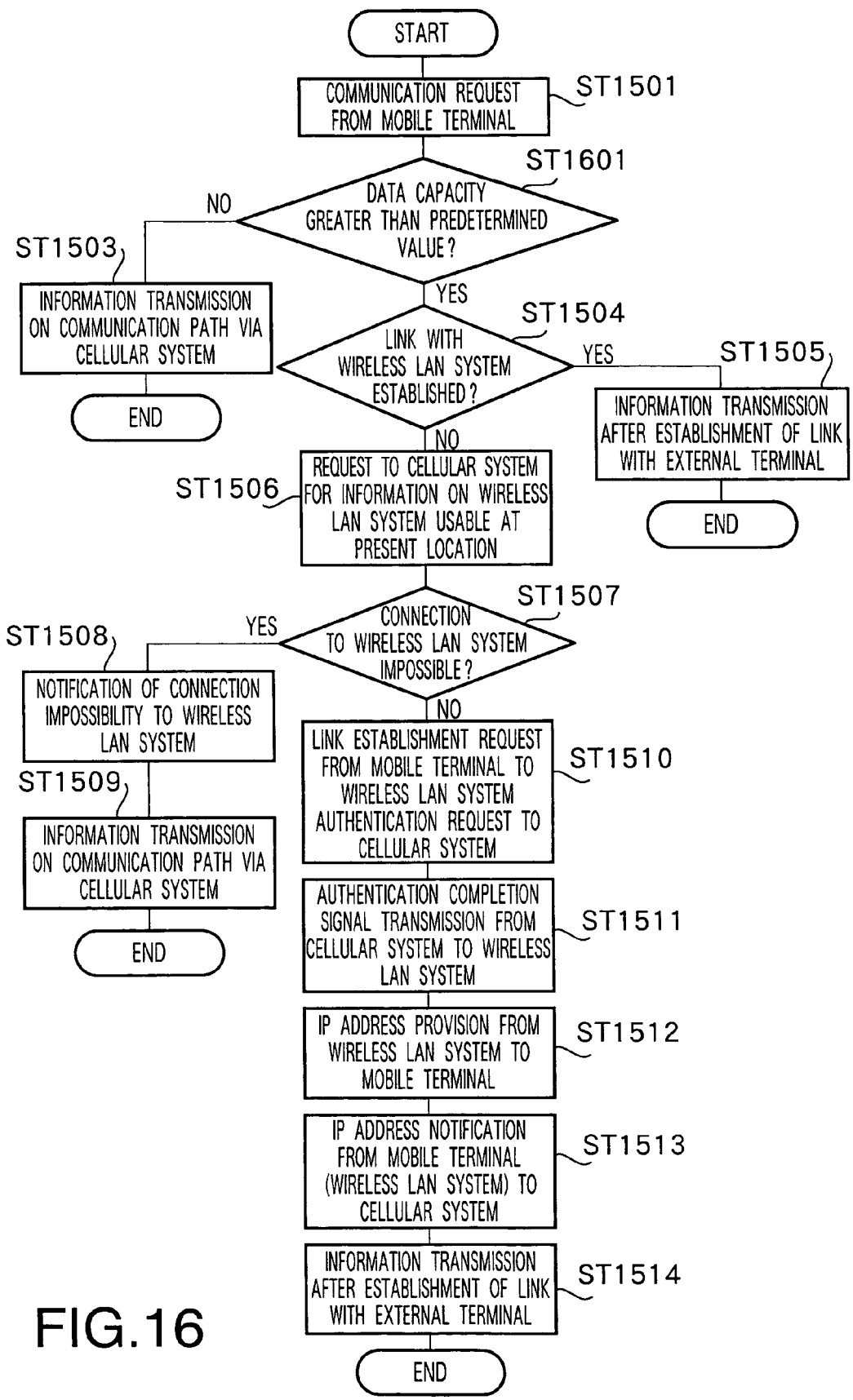
FIG. 16 is a flowchart of a case where information is transmitted from a mobile terminal to an external terminal connected to the Internet in an integrated wireless communication system according to Embodiment 5 of the present invention.

FIG. 16 is a flowchart of a case where information is transmitted from mobile terminal 400 to an external terminal connected to the Internet 500 in an integrated wireless communication system according to Embodiment 5. Processing steps in FIG. 16 identical to processing steps shown in FIG. 15 are assigned the same codes as in FIG. 15, and descriptions thereof are omitted.

Processing in an integrated wireless communication system according to Embodiment 5 differs from that in an integrated wireless communication system according to Embodiment 4 only in the processing whereby the data capacity for which transmission is specified by mobile terminal 400 is determined, and a communication path via cellular system 100 or a communication path via a wireless LAN system 200 is selected.

Specifically, the only difference is that when a communication request from mobile terminal 400 is received in ST1501, communication path selection section 4006 determines whether the data capacity of information for which this communication request was issued is greater than a predetermined value (ST1601).

If the data capacity of information is greater than the predetermined value, processing proceeds to ST1504, a communication path via a wireless LAN system 200 is selected, and information transmission is performed. On the other hand, if the data capacity of information is less than or equal to the predetermined value, processing proceeds to ST1503, a communication path via cellular system 100 is selected, and information transmission is performed.

Thus, according to an integrated wireless communication system of Embodiment 5, unlike an integrated wireless communication system of Embodiment 4, when information transmission is performed from a mobile terminal 400 to an external terminal, a communication path via cellular system 100 or a communication path via a wireless LAN system 200 is selected according to the data capacity of information for which there is a communication request. Therefore, in addition to obtaining the effect of implementation of wireless communication provided with a mobile terminal 400 authentication function in cellular system 100 and a large-capacity data transmission function in a wireless LAN system 200, obtained in an integrated wireless communication system according to Embodiment 4, it is possible to select an appropriate communication path according to the data capacity of information for which there is a communication request from mobile terminal 400, and transmit that information.

In the above description, a case has been described in which, when a communication path is selected, selection is performed according to the data capacity for which there is a communication request from a mobile terminal 400, but this is not a limitation. For example, communication path selection may be performed according to a transmission rate requested by mobile terminal 400. In this case, also, the same kind of effect can be obtained as with an integrated wireless communication system according to Embodiment 5.

Embodiment 6

Whereas an integrated wireless communication system according to Embodiment 5 selects a communication path via cellular system 100 or via a wireless LAN system 200 according to the data capacity of information for which there is a communication request from a mobile terminal 400, an integrated wireless communication system according to Embodiment 6 differs in selecting a communication path after assessing the wireless LAN congestion status in addition to the data capacity for which there is a communication request.

In order to select a communication path after assessing the wireless LAN congestion status in addition to the data capacity for which there is a communication request from mobile terminal 400, in an integrated wireless communication system according to Embodiment 6, mobile terminal 400 has a new configuration.

Figure 17:
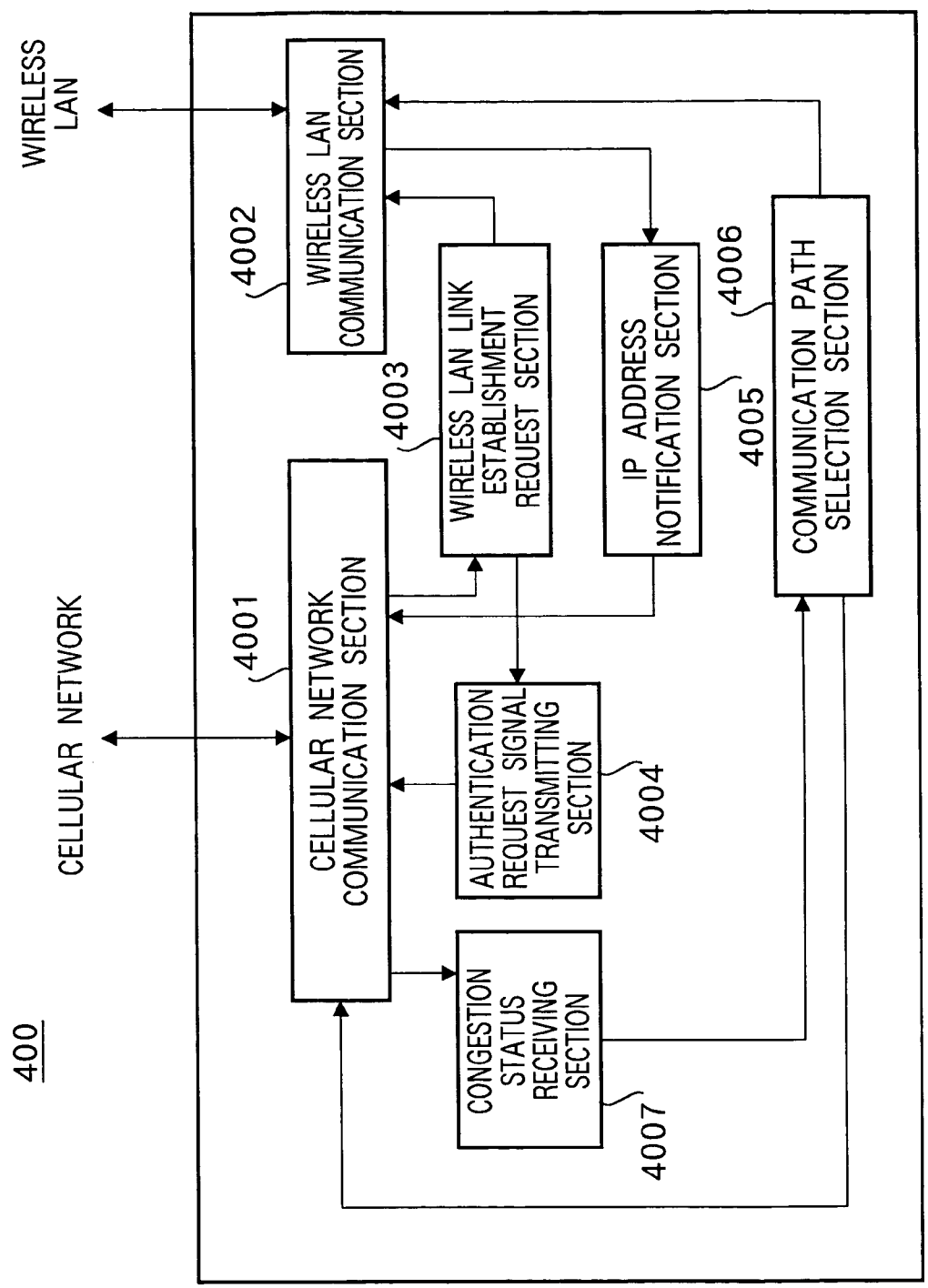
FIG. 17 is a block diagram showing the configuration of a mobile terminal according to Embodiment 6 of the present invention.

FIG. 17 is a block diagram showing the configuration of a mobile terminal 400 according to Embodiment 6. Parts in FIG. 17 identical to those in FIG. 14 are assigned the same codes as in FIG. 14, and descriptions thereof are omitted.

As shown in FIG. 17, a mobile terminal 400 according to Embodiment 6 differs from a mobile terminal 400 according to Embodiment 5 in having a congestion status receiving section 4007, and in that communication path selection section 4006 assesses the wireless LAN congestion status when selecting a communication path according to the data capacity.

Congestion status receiving section 4007 receives the congestion status of a wireless LAN connected to cellular system 100 from cellular network exchange unit 102 of cellular system 100. Therefore, in an integrated wireless communication system of Embodiment 6, cellular network exchange unit 102 requires a configuration that ascertains the congestion status of a wireless LAN connected to cellular system 100—for example, a configuration such as that of wireless LAN congestion status receiving section 1023 according to Embodiment 3. It is here assumed that cellular network exchange unit 102 has a wireless LAN congestion status receiving section 1023. That is to say, it is assumed that a cellular network exchange unit 102 according to Embodiment 6 has the configuration shown in FIG. 10.

Next, a description will be given of operations when information is transmitted from a mobile terminal 400 to an external terminal connected to the Internet 500 in an integrated wireless communication system according to Embodiment 6.

Figure 18:
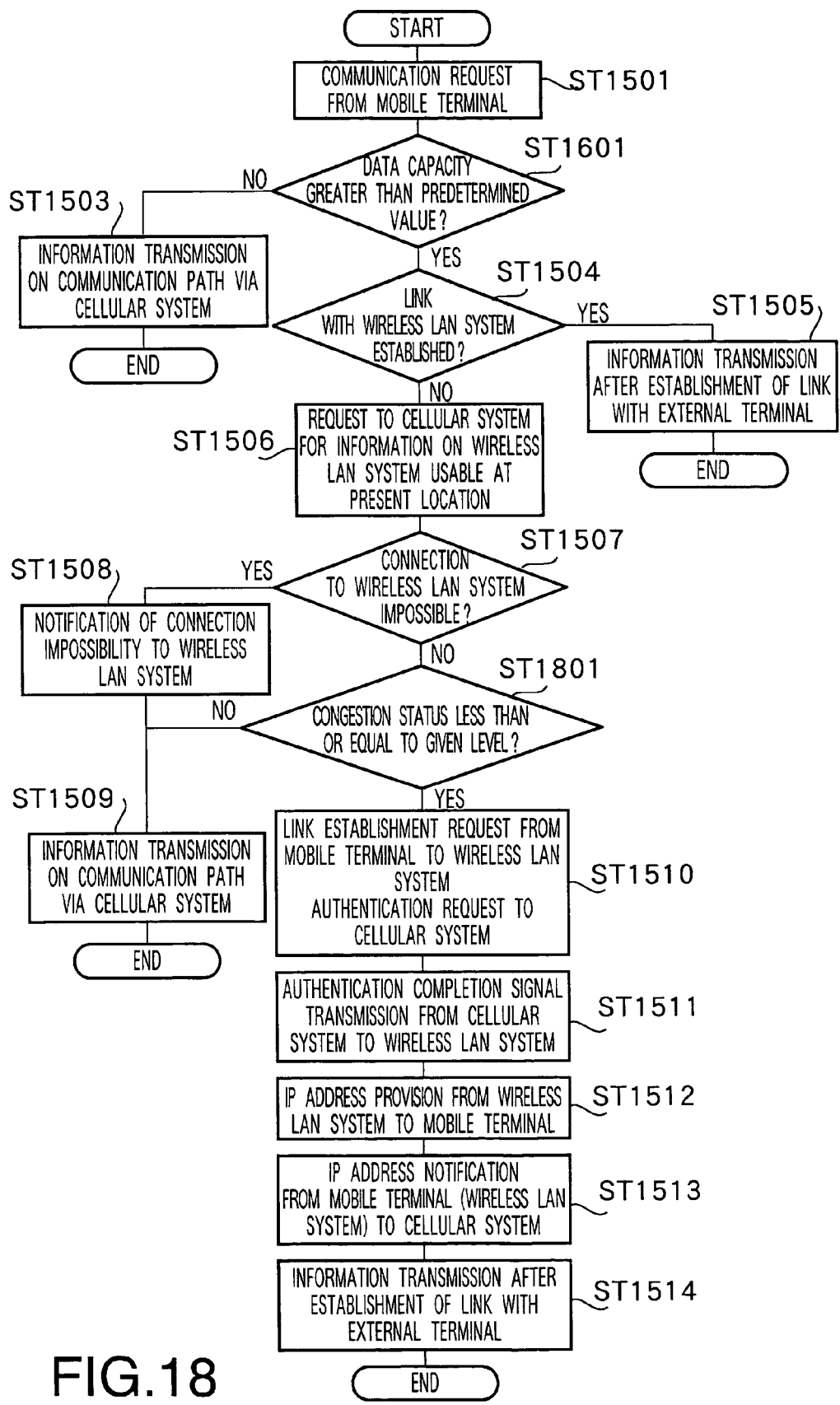
FIG. 18 is a flowchart of a case where information is transmitted from a mobile terminal to an external terminal connected to the Internet in an integrated wireless communication system according to Embodiment 6 of the present invention.

FIG. 18 is a flowchart of a case where information is transmitted from a mobile terminal 400 to an external terminal connected to the Internet 500 in an integrated wireless communication system according to Embodiment 6. Processing steps in FIG. 18 identical to processing steps shown in FIG. 16 are assigned the same codes as in FIG. 16, and descriptions thereof are omitted.

Processing in an integrated wireless communication system according to Embodiment 6 differs from that in an integrated wireless communication system according to Embodiment 5 only in that the congestion status of a usable wireless LAN system 200 reported by the cellular system is assessed when selecting a communication path.

Specifically, an integrated wireless communication system according to Embodiment 6 differs from that in an integrated wireless communication system according to Embodiment 5 only as follows. In ST1507 it is confirmed whether or not contract contents allow connection to a wireless LAN system 200, and if the contract contents allow connection to a wireless LAN system 200, information on a wireless LAN system 200 that can be used by mobile terminal 400 is reported to mobile terminal 400, and the congestion status of that wireless LAN system 200 is also reported. In mobile terminal 400, the wireless LAN system 200 congestion status reported by cellular system 100 is received by congestion status receiving section 4007. Communication path selection section 4006 determines whether or not the congestion status is less than or equal to a given level (ST1801).

Then, if the wireless LAN system 200 congestion status is less than or equal to the given level, processing proceeds to ST1510, a communication path via wireless LAN system 200 is selected, and information transmission is performed. On the other hand, if the wireless LAN system 200 congestion status is greater than the given level, processing proceeds to ST1509, a communication path via cellular system 100 is selected, and information transmission is performed.

Thus, according to an integrated wireless communication system of Embodiment 6, unlike an integrated wireless communication system of Embodiment 5, when information transmission is performed from a mobile terminal 400 to an external terminal, a communication path via cellular system 100 or a communication path via a wireless LAN system 200 is selected according to the data capacity of information for which there is a communication request, and also, a communication path is selected taking the wireless LAN system 200 congestion status into consideration. Therefore, in addition to obtaining the effect of implementation of wireless communication provided with a mobile terminal 400 authentication function in cellular system 100 and a large-capacity data transmission function in a wireless LAN system 200, obtained in an integrated wireless communication system according to Embodiment 4 or 5, it is possible to select a communication path flexibly according to the network congestion status. As a result, it is possible to prevent dependably a state in which data is not transmitted to an external terminal due to the wireless LAN congestion status.

In the above description, a case has been described in which only the wireless LAN congestion status is assessed in selecting a communication path, but this is not a limitation. It is also possible to assess the cellular network congestion status as well as the wireless LAN congestion status in selecting a communication path. In this case, a communication path via a wireless LAN system 200 can be selected even if the data capacity is small, enabling more efficient information transmission from a mobile terminal 400 to be implemented.

Embodiment 7

In an integrated wireless communication system according to Embodiment 6, when information transmission is performed from a mobile terminal 400 to an external terminal, a communication path via cellular system 100 or a communication path via a wireless LAN system 200 is selected by mobile terminal 400. An integrated wireless communication system according to Embodiment 7 differs from this in that the communication path is effectively selected by cellular system 100.

In order for a communication path to be selected by cellular system 100 when information transmission is performed from a mobile terminal 400 to an external terminal, in an integrated wireless communication system according to Embodiment 7, mobile terminal 400 and cellular network exchange unit 102 of cellular system 100 have new configurations.

Figure 19:
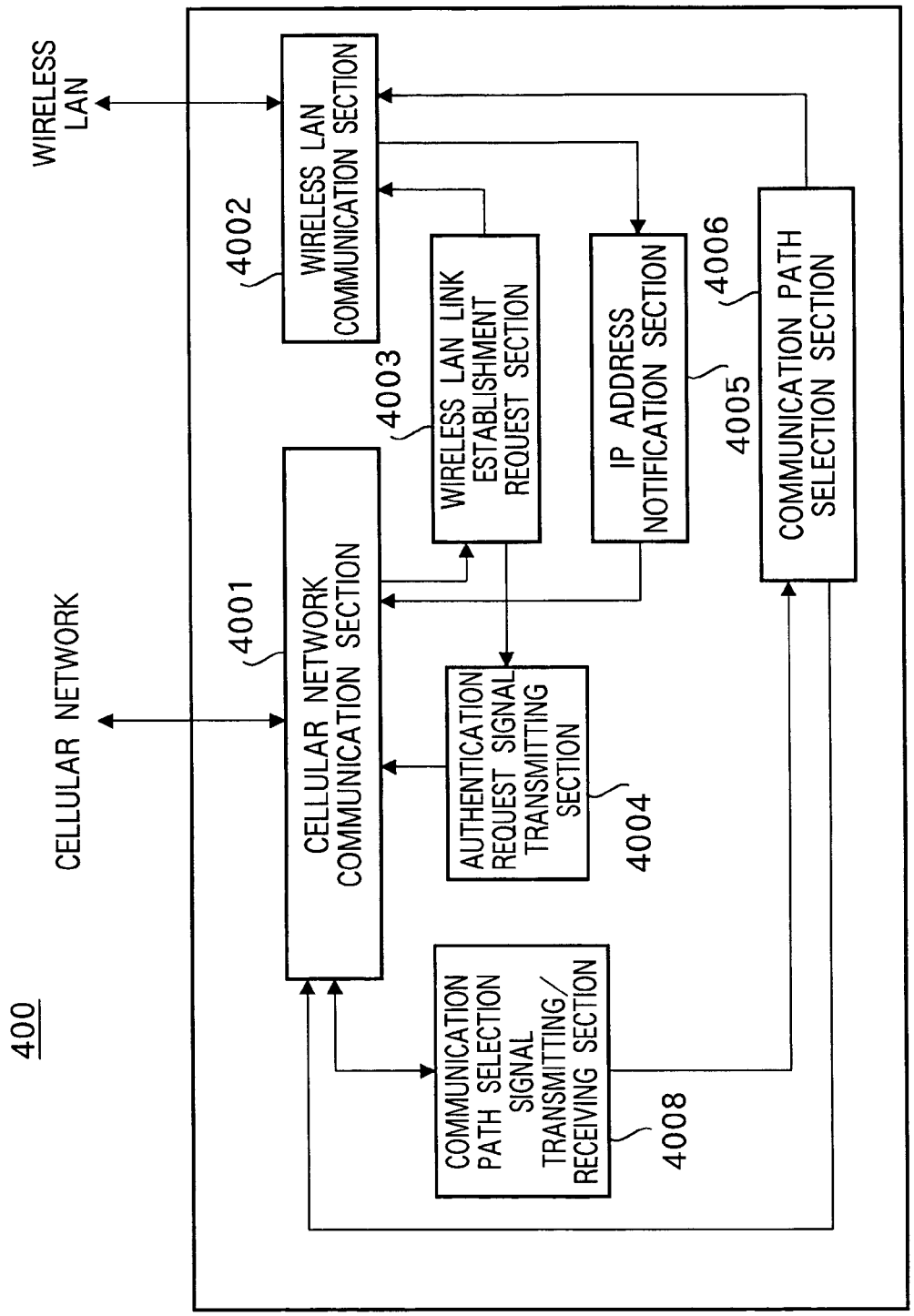
FIG. 19 is a block diagram showing the configuration of a mobile terminal according to Embodiment 7 of the present invention.
Figure 20:
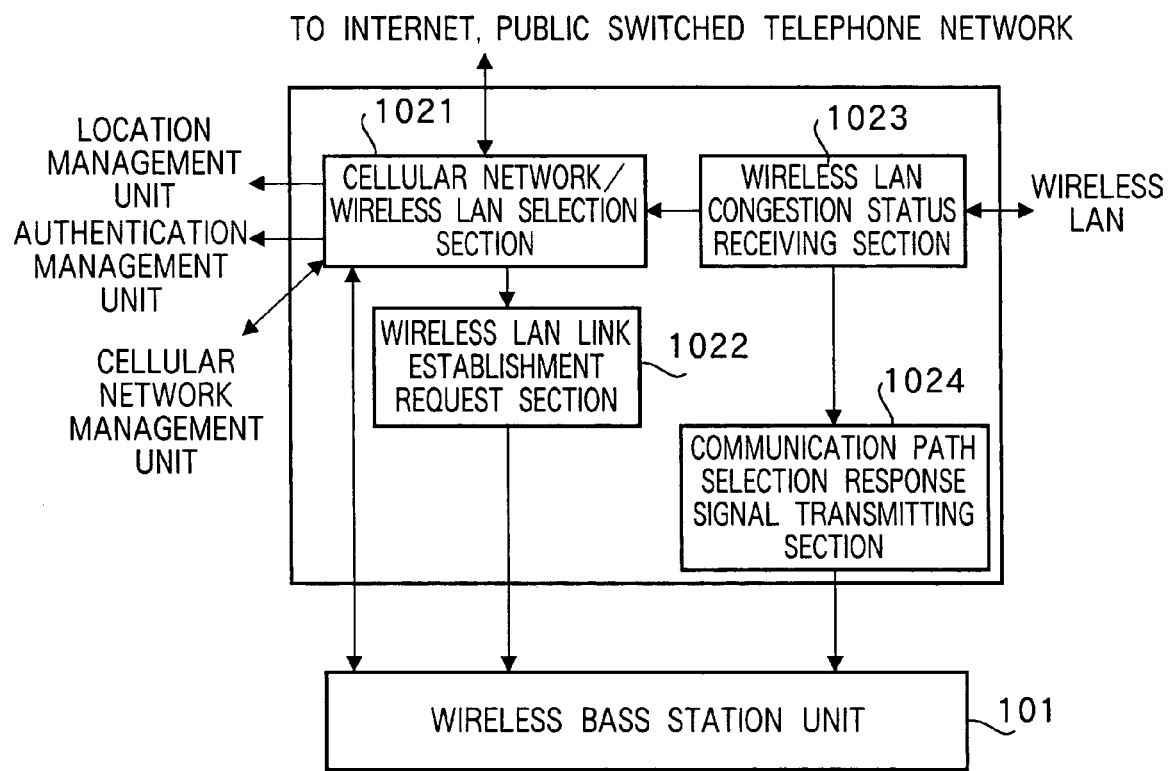
FIG. 20 is a block diagram showing the configuration of a cellular network exchange unit according to Embodiment 7.

FIG. 19 is a block diagram showing the configuration of a mobile terminal 400 according to Embodiment 7 of the present invention, and FIG. 20 is a block diagram showing the configuration of a cellular network exchange unit 102 according to Embodiment 7. Parts in FIG. 19 and FIG. 20 identical to those in FIG. 17 and FIG. 10 respectively are assigned the same codes as in FIG. 17 and FIG. 10, and descriptions thereof are omitted.

As shown in FIG. 19, a mobile terminal 400 according to Embodiment 7 differs from a mobile terminal 400 according to Embodiment 6 in having a communication path selection signal transmitting/receiving section 4008 instead of congestion status receiving section 4007, and in that communication path selection section 4006 selects a communication path according to the result of a communication path selection response signal transmitted from cellular system 100.

Communication path selection signal transmitting/receiving section 4008 gives the data capacity of information that is the object of communication and transmits a communication path selection request signal to cellular system 100 requesting communication path selection. In return, communication path selection signal transmitting/receiving section 4008 receives a communication path selection response signal from cellular system 100 indicating the communication path selection result.

As shown in FIG. 20, a cellular network exchange unit 102 according to Embodiment 7 differs from a cellular network exchange unit 102 according to Embodiment 6 in having a communication path selection response signal transmitting section 1024.

In response to a communication path selection request from mobile terminal 400, communication path selection response signal transmitting section 1024 transmits a communication path selection response signal indicating the communication path selection result.

Next, a description will be given of operations when information is transmitted from a mobile terminal 400 to an external terminal connected to the Internet 500 in an integrated wireless communication system according to Embodiment 7.

Figure 21:
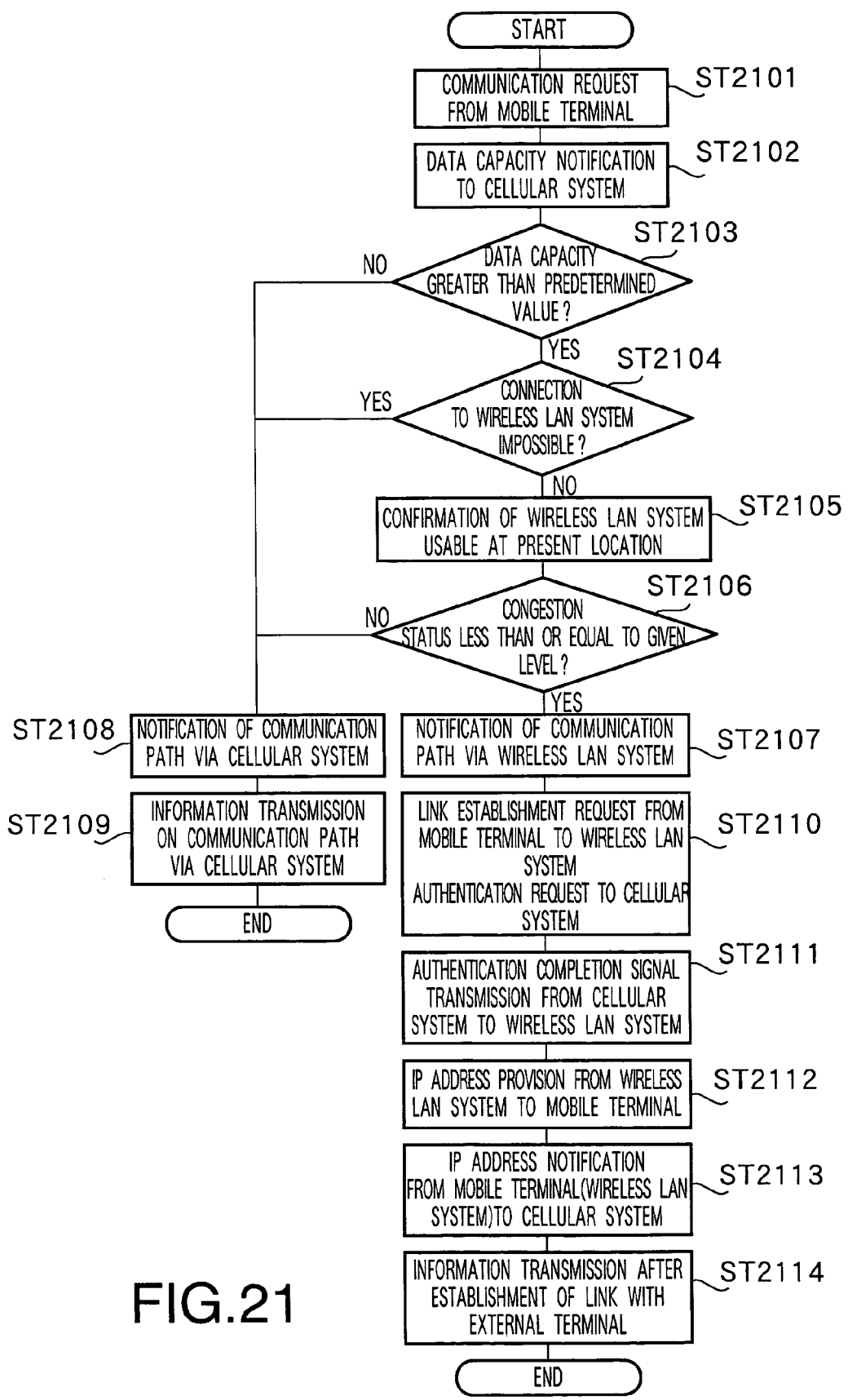
FIG. 21 is a flowchart of a case where information is transmitted from a mobile terminal to an external terminal connected to the Internet in an integrated wireless communication system according to Embodiment 7.

FIG. 21 is a flowchart of a case where information is transmitted from a mobile terminal 400 to an external terminal connected to the Internet 500 in an integrated wireless communication system according to Embodiment 7.

When information is transmitted from mobile terminal 400 to an external terminal connected to the Internet 500, the mobile terminal 400 receives a communication request from a user (ST2101).

When the communication request is received, in mobile terminal 400, communication path selection signal transmitting/receiving section 4008 gives the data capacity of information for which there is a communication request and transmits a communication path selection request signal to cellular network exchange unit 102 via cellular network communication section 4001 (ST2102).

When this communication path selection request signal is received, in cellular network exchange unit 102, cellular network/wireless LAN selection section 1021 determines the data capacity for which notification was received. Specifically, cellular network/wireless LAN selection section 1021 determines whether the reported data capacity is greater than a predetermined value (ST2103).

If the data capacity is greater than the predetermined value, cellular network/wireless LAN selection section 1021 confirms the mobile terminal 400 user's contract contents managed by cellular network management unit 105. Specifically, cellular network/wireless LAN selection section 1021 confirms whether or not the contract contents allow connection to a wireless LAN system 200 (ST2104).

If the contract contents allow connection to a wireless LAN system 200, cellular network/wireless LAN selection section 1021 confirms the location of mobile terminal 400 based on location information registered in cellular network location information management section 1042 of location management unit 104. A wireless LAN system 200 that can be used by mobile terminal 400 at the present location of mobile terminal 400 is then confirmed (ST2105).

Next, cellular network/wireless LAN selection section 1021 determines whether the congestion status of a wireless LAN system 200 that can be used by mobile terminal 400 at the present location of mobile terminal 400 is less than or equal to a given level (ST2106).

If the wireless LAN system 200 congestion status is less than or equal to the given level, in cellular network/wireless LAN selection section 1021, a communication path selection response signal reporting that a communication path via a wireless LAN system 200 should be selected is transmitted from communication path selection response signal transmitting section 1024 to mobile terminal 400 (ST2107).

On the other hand, when the data capacity reported by mobile terminal 400 in ST2103 is less or equal to than the predetermined value, if it was determined in ST2104 that the contract contents do not allow wireless LAN system 200 connection, and the congestion status of a wireless LAN system 200 that can be used by mobile terminal 400 is assessed in ST2106 to be greater than the given level, a communication path selection response signal reporting that a communication path via cellular system 100 should be selected is transmitted to mobile terminal 400 from communication path selection response signal transmitting section 1024 (ST2108).

At this time, information on a wireless LAN system 200 that can be used at the present location of mobile terminal 400 is also reported from cellular network exchange unit 102 together with the communication path selection response signal.

In mobile terminal 400, this communication path selection response signal is received by communication path selection signal transmitting/receiving section 4008. If a communication path via cellular system 100 is reported by the communication path selection response signal, communication path selection section 4006 selects a communication path via cellular system 100. Then mobile terminal 400 calls an external terminal via a communication path via cellular system 100, and after establishing a link with the external terminal, transmits information specified by the user to the external terminal by means of cellular network communication section 4001 (ST2109).

On the other hand, if a communication path via a wireless LAN system 200 is reported by the communication path selection response signal, communication path selection section 4006 selects a communication path via a wireless LAN system 200.

When a communication path via a wireless LAN system 200 is selected, wireless LAN link establishment request section 4003 of mobile terminal 400 requests establishment of a link to the specified wireless LAN system 200, and authentication request signal transmitting section 4004 transmits an authentication request signal to cellular system 100 (ST2110). The wireless LAN system 200 link establishment request contains the user ID of mobile terminal 400.

When the authentication request signal is received, authentication management unit 106 of cellular system 100 performs mobile terminal 400 authentication processing. When authentication processing is completed, authentication management unit 106 sends an authentication completion signal containing the mobile terminal 400 user ID to wireless LAN system 200 via exchange equipment 300 (ST2111).

When the authentication completion signal is received, wireless LAN management unit 203 compares the user ID contained in the link establishment request with the user ID contained in this authentication completion signal, and confirms final authentication of mobile terminal 400.

When confirmation is completed as far as final authentication of mobile terminal 400, IP address provision section 2022 of wireless LAN exchange unit 202 assigns a mobile terminal 400 IP address (ST2112). By this means, a link is established between mobile terminal 400 and wireless LAN system 200. This IP address is reported to mobile terminal 400 via wireless LAN access unit 201.

On receiving IP address notification, mobile terminal 400 or wireless LAN system 200 reports the IP address assigned to mobile terminal 400 to location management unit 104 of cellular system 100 (ST2113). The reported IP address is registered in wireless LAN location information management section 1043 of location management unit 104 as corresponding to the cellular network number of mobile terminal 400. In IP address notification from wireless LAN system 200, the IP address is reported to cellular system 100 via IP address notification section 3001 of exchange equipment 300.

After establishing a link with wireless LAN system 200, mobile terminal 400 calls the address of the external terminal via a communication path via wireless LAN system 200, and after a link is established with the external terminal, wireless LAN communication section 4002 transmits the information specified by the user to the external terminal (ST2114).

Thus, according to an integrated wireless communication system of Embodiment 7, unlike an integrated wireless communication system of Embodiment 6, when information transmission is performed from mobile terminal 400 to an external terminal, a communication path is selected by cellular system 100, and information transmission from mobile terminal 400 is performed via that communication path. Therefore, in addition to obtaining the effect of implementation of wireless communication provided with a mobile terminal 400 authentication function in cellular system 100 and a large-capacity data transmission function in a wireless LAN system 200, obtained in an integrated wireless communication system according to Embodiments 4 through 6, it is possible to simplify communication path selection control in mobile terminal 400.

When a wireless communication service is provided using an integrated wireless communication system as described above, it is possible that charging information for service users will be managed by this integrated wireless communication system. A case is described below in which service user charging information is managed by this integrated wireless communication system.

When charging information is managed by this integrated wireless communication system, exchange of charging information between cellular system 100 and a wireless LAN system 200 is performed by exchange equipment 300. Charging information for service users is managed en bloc by cellular system 100. In cellular system 100, charging information is managed by cellular network management unit 105 together with mobile terminal 400 user information.

As charging processing in this integrated wireless communication system, it is necessary for fees provided to wireless LAN system 200 operators to be varied for a wireless LAN system 200 for which a user has a contract and a wireless LAN system 200 for which a user does not have a contract.

For a wireless LAN system 200 operator with which a user has a contract, the total of the connection fees (or part of the connection fees) collected as contract fees from the user may be provided to the operator. In this case, the amount to be provided to the wireless LAN system 200 operator can be calculated by confirming the user's contract status managed by cellular network management unit 105.

On the other hand, for a wireless LAN system 200 operator with which a user does not have a contract, it may be that, in addition to a connection fee of a fixed amount, connection fees will be provided to the operator according to the number of times, or length of time, the user is actually connected to that wireless LAN system 200. That is to say, a usage-based charging system may be adopted, based on the number of times a user is connected or the length of time for which a user is connected.

When this kind of usage-based charging system is adopted, a function is required for counting the number of times connected or length of time connected to a wireless LAN system 200. When the number of times connected or length of time connected to a wireless LAN system 200 is counted, the number of times connected or length of time connected can be detected by detecting the number of times, or duration, of establishment of a link from a mobile terminal 400 to wireless LAN system 200.

In this integrated wireless communication system, while a link is established between a mobile terminal 400 and wireless LAN system 200, an IP address is registered in location management unit 104 in cellular system 100, and when the link is cleared the IP address is deleted. Therefore, the number of times connected or length of time connected to a wireless LAN system 200 can be detected by using this characteristic of the IP address.

Also, in this integrated wireless communication system, when a link is established between a mobile terminal 400 and wireless LAN system 200, authentication management unit 106 performs mobile terminal 400 authentication processing. Therefore, the number of times a mobile terminal 400 is connected or length of time for which a mobile terminal 400 is connected to a wireless LAN system 200 can be detected by detecting the authentication completion signal sent to wireless LAN system 200 at the time of this authentication processing.

In cellular system 100, connection fees can also be provided appropriately to a wireless LAN system 200 operator with which a user does not have a contract by calculating wireless LAN system 200 operator connection fees according to the number of times connected or length of time connected, detected in this way.

Figure 22:
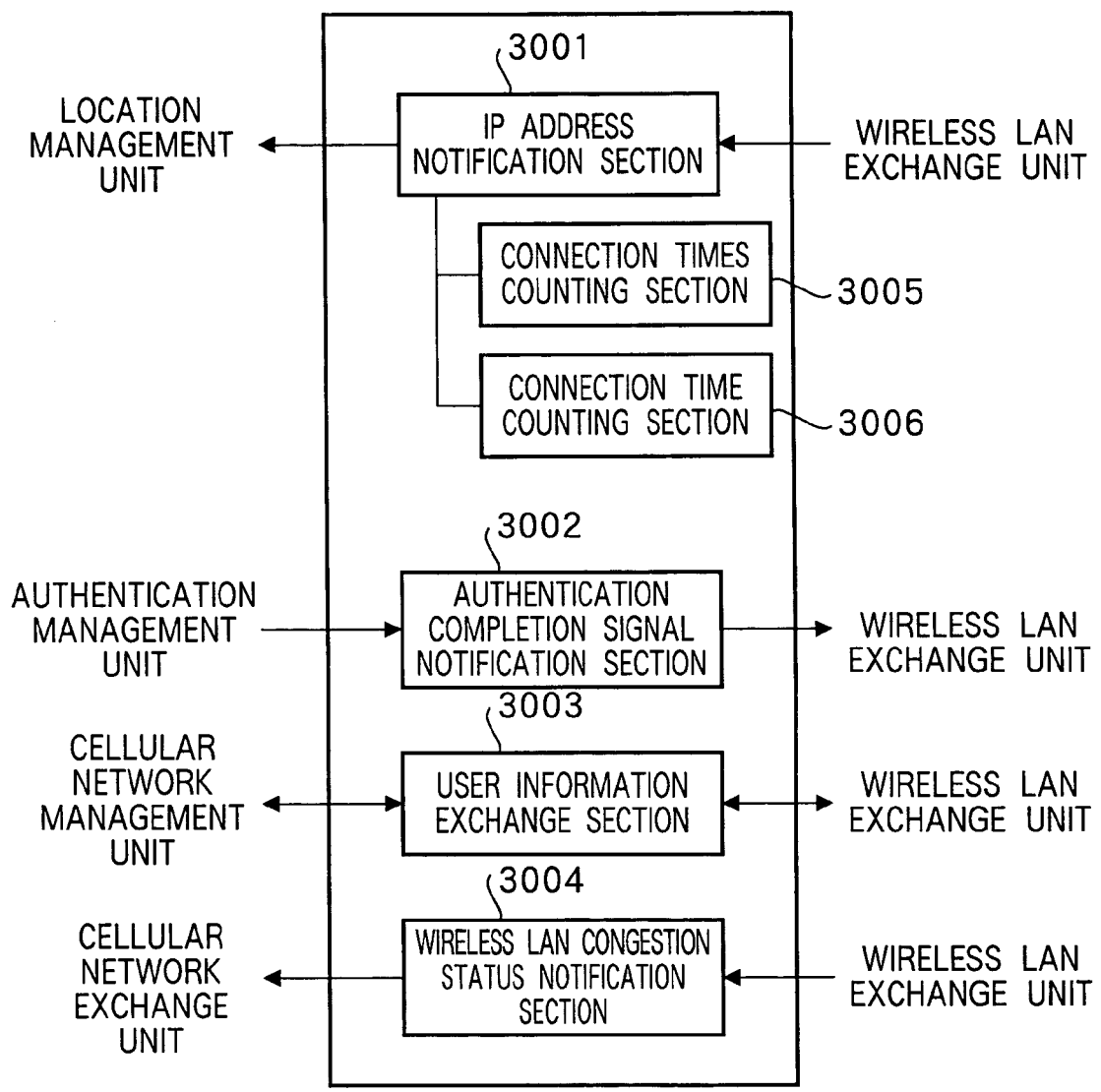
FIG. 22 is a drawing showing a sample variant of an exchange unit of an integrated wireless communication system according to the present invention.
Figure 23:
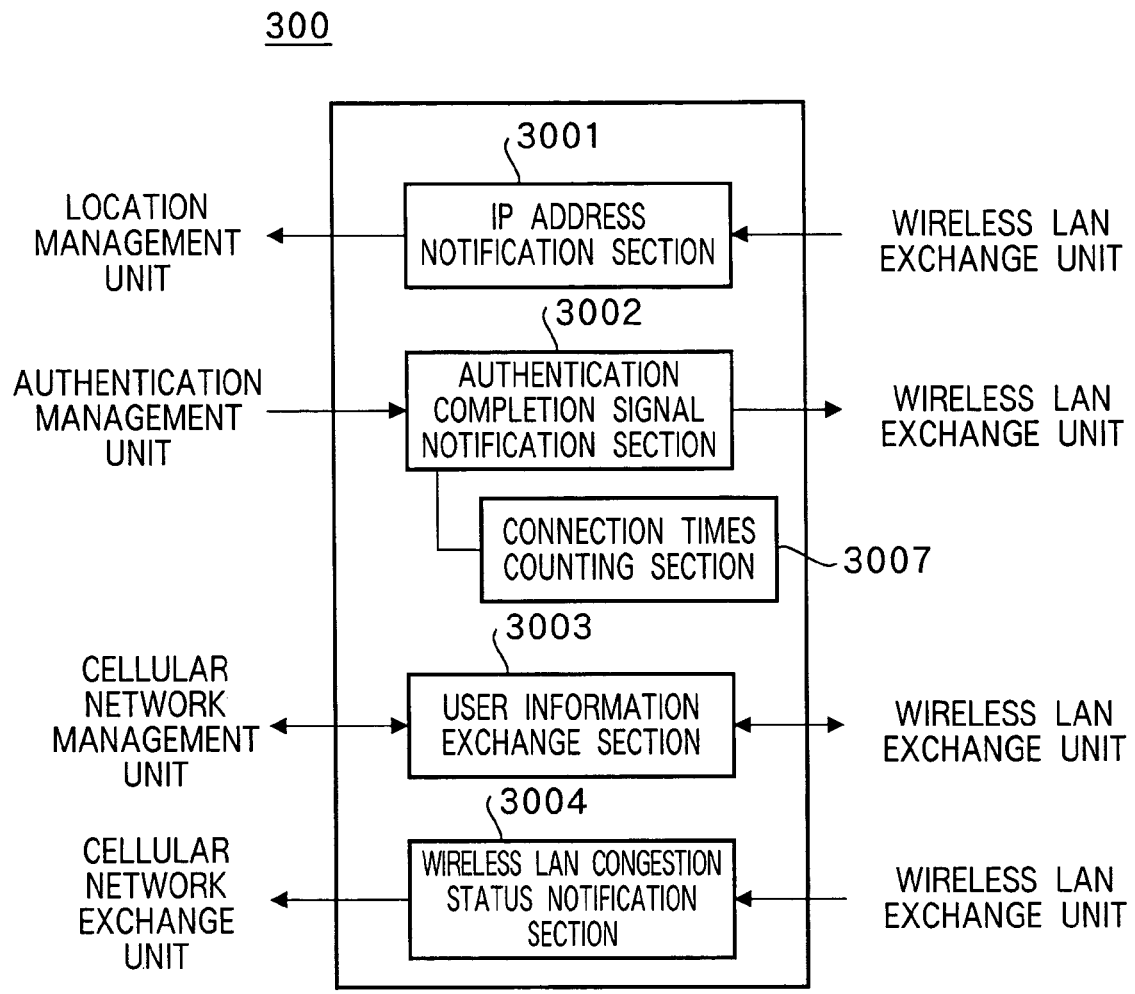
FIG. 23 is a drawing showing a sample variant of an exchange unit of an integrated wireless communication system according to the present invention.

Detection of the number of times connected or length of time connected to a wireless LAN system 200 may be performed by cellular network exchange unit 102. However, this is not a limitation, and it is also possible to equip IP address notification section 3001 of exchange equipment 300 with a connection times counting section 3005 provided with a function that detects IP address notifications and a connection time counting section 3006 provided with a function that detects the time from IP address notification to link clearance notification, as shown in FIG. 22, or to equip authentication completion signal notification section 3002 of exchange equipment 300 with a connection times counting section 3007 provided with a function that detects authentication completion signals, as shown in FIG. 23, and for cellular network exchange unit 102 to ascertain the number of times connected or length of time connected according to the contents detected thereby. In this way, charging processing can be performed in a similarly appropriate way when detection is carried out by exchange equipment 300.

Also, when a wireless communication service is provided that uses this integrated wireless communication system, when communication path via a wireless LAN system 200 is selected, differentiation of the guaranteed transmission band may be implemented according to a mobile terminal 400 user's contract contents.

It may be, for example, that the transmission band is guaranteed in the case of connection to a wireless LAN system 200 for which a mobile terminal 400 user has a contract, whereas in the case of connection to a wireless LAN system 200 for which a mobile terminal 400 user does not have a direct contract, although there is an alliance with cellular system 100, the transmission band is not guaranteed, but is provided on a best-effort basis according to the utilization situation of that wireless LAN. By varying the guaranteed transmission band according to contract contents in this way, it is possible to provide a variety of services employing this integrated wireless communication system.

Similarly, when a communication path via a wireless LAN system 200 is selected in the above-described integrated wireless communication system, information transmission priority may be varied according to a mobile terminal 400 user's contract contents.

It may be, for example, that information transmission is performed preferentially in the case of connection to a wireless LAN system 200 for which a mobile terminal 400 user has a contract, whereas in the case of connection to a wireless LAN system 200 for which a mobile terminal 400 user does not have a contract, although there is an alliance with cellular system 100, information transmission is performed according to the aforementioned priority. By varying information transmission priority according to contract contents in this way, it is possible to provide a variety of services employing this integrated wireless communication system.

As will be clear to those skilled in the art, the present invention can be implemented using a digital computer or microprocessor available on the general market that is programmed in accordance with the techniques described in the above embodiments. As will be clear to those skilled in the art, the present invention includes a computer program created by a person or persons skilled in the art based on the techniques described in the above-described embodiments.

A computer program product which is a recording medium containing instructions that can be used to program a computer that implements the present invention is included within the scope of the present invention. This recording medium corresponds to a disk such as a floppy (R) disk, optical disk, CD-ROM, or magnetic disk, or ROM, RAM, EPROM, EEPROM, a magneto-optical card, memory card, DVD, or the like, but is not limited to these in particular.

This application is based on Japanese Patent Application No. 2002-294196 filed on Oct. 7, 2002, entire content of which is expressly incorporated by reference herein.

INDUSTRIAL APPLICABILITY

As described above, according to the present invention it possible to perform wireless communication provided with a mobile terminal authentication function according to a cellular system (mobile communication system) and a large-capacity data transmission function according to a wireless LAN system.

The invention claimed is:

1. An integrated wireless communication system comprising:
   a wireless LAN system that performs wireless communication with a mobile terminal of a wireless LAN area; and
   a mobile communication system linked to said wireless LAN system via exchange equipment, wherein:

said mobile communication system (i) comprises a location information management section, the location information management section registering an IP address assigned to said mobile terminal as location information when a link is established between said wireless LAN system and said mobile terminal, (ii) selects a communication path either via the mobile communication system or via said wireless LAN system when there is a request for communication with said mobile terminal from an external terminal, and (iii) reports said mobile terminal IP address in said location information management section to said external terminal upon selecting a communication path via said wireless LAN system.

2. The integrated wireless communication system according to claim 1, wherein said mobile communication system selects one or another said communication path according to a communication path request from said external terminal.

3. The integrated wireless communication system according to claim 1, wherein said mobile communication system selects one or another said communication path according to transmit data capacity of information for which there is a communication request from said external terminal.

4. The integrated wireless communication system according to claim 3, wherein said mobile communication system selects a communication path via said wireless LAN system when transmit data capacity of information for which there is a communication request from said external terminal is greater than a predetermined value, and selects a communication path via said mobile communication system when transmit data capacity of information for which there is a communication request from said external terminal is less than a predetermined value.

5. The integrated wireless communication system according to claim 1, wherein said mobile communication system, in a case where a communication path via said wireless LAN system is selected, when said mobile terminal IP address has not been registered in said location information management section, calls said mobile terminal using a paging channel of that mobile communication system and also requests establishment of a link to said wireless LAN system; said mobile terminal, after establishing a link with said wireless LAN system according to that link establishment request, reports to said mobile communication system an IP address assigned from that wireless LAN system; and said mobile communication system registers that IP address in said location information management section and also reports that IP address to said external terminal.

6. The integrated wireless communication system according to claim 1, wherein said mobile communication system, in a case where a communication path via said wireless LAN system is selected, when said mobile terminal IP address has not been registered in said location information management section, calls said mobile terminal using a paging channel of that mobile communication system and also requests establishment of a link to said wireless LAN system; when said mobile terminal establishes a link with said wireless LAN system according to that link establishment request, said wireless LAN system reports to said mobile communication system an IP address assigned from that wireless LAN system to that mobile terminal via said exchange equipment; and said mobile communication system registers that IP address in said location information management section and also reports that IP address to said external terminal.

7. The integrated wireless communication system according to claim 5, wherein said mobile terminal or wireless LAN system reports said IP address to said mobile communication system at fixed intervals while said mobile terminal has a link established with said wireless LAN system; and when notification of that IP address is interrupted, said mobile communication system deletes that IP address registered in said location information management section.

8. The integrated wireless communication system according to claim 5, wherein said mobile terminal or wireless LAN system reports said IP address when that mobile terminal establishes a link with a wireless LAN system and also, when a link is cleared, reports this fact to said mobile communication system; and said mobile communication system, on receiving notification to the effect that a link has been cleared from said mobile terminal or wireless LAN system, deletes that IP address registered in said location information management section.

9. The integrated wireless communication system according to claim 5, wherein:
said mobile communication system further comprises an authentication management section that, when said mobile terminal establishes a link with said wireless LAN system, performs authentication of that mobile terminal; and
said mobile terminal issues a request for authentication to said mobile communication system when a link with said wireless LAN system is established; said mobile communication system, on completion of authentication of said mobile terminal, sends an authentication completion signal to said wireless LAN system via said exchange equipment; and said wireless LAN system assigns a channel to said mobile terminal according to said authentication completion signal.

10. The integrated wireless communication system according to claim 1, wherein said mobile communication system, when there is a request for communication with an external terminal from said mobile terminal, selects a communication path either via that mobile communication system or via said wireless LAN system.

11. The integrated wireless communication system according to claim 10, wherein:
said mobile communication system further comprises an authentication management section that, when said mobile terminal establishes a link with said wireless LAN system, performs authentication of that mobile terminal; and
when a communication path via said wireless LAN system is selected, if a link has not been established between said mobile terminal and said wireless LAN system, said mobile terminal issues a request for authentication to said mobile communication system when establishing a link with said wireless LAN system; said mobile communication system, on completion of authentication of said mobile terminal, sends an authentication completion signal to said wireless LAN system via said exchange equipment; and said wireless LAN system assigns a channel to said mobile terminal according to said authentication completion signal.

12. The integrated wireless communication system according to claim 10, wherein said mobile communication system or mobile terminal selects one or another said communication path according to a communication path request from said mobile terminal.

13. The integrated wireless communication system according to claim 10, wherein said mobile communication system or mobile terminal selects one or another said communication path according to transmit data capacity of information for which there is a communication request from said mobile terminal.

14. The integrated wireless communication system according to claim 13, wherein said mobile communication system or mobile terminal selects a communication path via said wireless LAN system when transmit data capacity of information for which there is a communication request from said mobile terminal is greater than a predetermined value, and selects a communication path via said mobile communication system when transmit data capacity of information for which there is a communication request from said mobile terminal is less than a predetermined value.

15. The integrated wireless communication system according to claim 13, wherein said mobile communication system or mobile terminal assesses a congestion status of a network managed by said mobile communication system and wireless LAN system, and selects one or another said communication path.

16. The integrated wireless communication system according to claim 10, wherein said mobile terminal, when establishing a link with said wireless LAN system, issue a request to said mobile communication system for information on a wireless LAN system that can be used at a present location, and establishes a link with said wireless LAN system using information sent in response from said mobile communication system.

17. The integrated wireless communication system according to claim 10, wherein said mobile communication system reports information on a wireless LAN system that can be used at a present location of said mobile terminal to that mobile terminal constantly or at fixed intervals, and said mobile terminal, when establishing a link with said wireless LAN system, establishes a link with said wireless LAN system using information reported from said mobile communication system.

18. The integrated wireless communication system according to claim 16, wherein said mobile terminal, after establishing a link with said wireless LAN system, reports to said mobile communication system an IP address assigned by that wireless LAN system, and said mobile communication system registers that IP address in a location information management section as location information.

19. The integrated wireless communication system according to claim 16, wherein said wireless LAN system reports to said mobile communication system via said exchange equipment an IP address assigned to said mobile terminal that established a link, and said mobile communication system registers that IP address in a location information management section as location information.

20. The integrated wireless communication system according to claim 18, wherein said mobile terminal or wireless LAN system reports said IP address to said mobile communication system at fixed intervals while that mobile terminal has a link established with a wireless LAN system; and when notification of that IP address is interrupted, said mobile communication system deletes that IP address registered in said location information management section.

21. The integrated wireless communication system according to claim 18, wherein said mobile terminal or wireless LAN system reports said IP address when that mobile terminal establishes a link with a wireless LAN system and also, when a link is cleared, reports this fact to said mobile communication system; and said mobile communication system, on receiving notification to the effect that a link has been cleared from said mobile terminal or wireless LAN system, deletes that IP address registered in said location information management section.

22. The integrated wireless communication system according to claim 1, wherein said mobile communication system further comprises a user information management section that manages a contract status of said wireless LAN system according to a user of said mobile terminal obtained via said exchange equipment; and when a communication path via said wireless LAN system is selected, a transmission band provided by said wireless LAN system is differentiated according to said contract contents.

23. The integrated wireless communication system according to claim 22, wherein in the case of connection to a wireless LAN system for which a user of said mobile terminal has a contract, a provided transmission band is guaranteed, and in the case of connection to a wireless LAN system for which a user of said mobile terminal does not have a contract, a transmission band is provided according to a utilization status of that wireless LAN system.

24. The integrated wireless communication system according to claim 1, wherein said mobile communication system further comprises a user information management section that manages a contract status of said wireless LAN system according to a user of said mobile terminal obtained via said exchange equipment; and when a communication path via said wireless LAN system is selected, in the case of connection to a wireless LAN system for which a user of said mobile terminal has a contract, information transmission from that user is given priority.

25. The integrated wireless communication system according to claim 1, wherein said mobile communication system further comprises a user information management section that manages a contract status of said wireless LAN system according to a user of said mobile terminal and charging information for a user of said mobile terminal obtained via said exchange equipment; and in the case of connection to a wireless LAN system for which a user of said mobile terminal has a contract, a contract fee of that wireless LAN system is managed as said charging information, while in the case of connection to a wireless LAN system for which a user of said mobile terminal does not have a contract, a connection fee in accordance with a number of times of connection from said mobile terminal to that wireless LAN system is managed as said charging information.

26. The integrated wireless communication system according to claim 25, wherein said mobile communication system detects a number of times of connection to said wireless LAN system when notification of said authentication completion signal to that wireless LAN system is performed or when IP address notification from a wireless LAN system is received.

27. The integrated wireless communication system according to claim 25, wherein said mobile communication system manages said charging information according to a number of times of connection to said wireless LAN system detected by said exchange equipment when notification of said authentication completion signal to said wireless LAN system or IP address notification from a wireless LAN system is received.

28. The integrated wireless communication system according to claim 1, wherein said mobile communication system further comprises a user information management section that manages a contract status of said wireless LAN system according to a user of said mobile terminal and charging information for a user of said mobile terminal obtained via said exchange equipment; and in the case of connection to a wireless LAN system for which a user of said mobile terminal has a contract, a contract fee of that wireless LAN system is managed as said charging information, while in the case of connection to a wireless LAN system for which a user of said mobile terminal does not have a contract, a connection fee in accordance with connection time from said mobile terminal to that wireless LAN system is managed as said charging information.

29. The integrated wireless communication system according to claim 28, wherein said mobile communication system detects connection time to said wireless LAN system based on IP address notification from said wireless LAN system and clearing notification after clearing of a link between that wireless LAN system and said mobile terminal.

30. The integrated wireless communication system according to claim 28, wherein said mobile communication system manages said charging information according to connection time to said wireless LAN system detected by said exchange equipment based on IP address notification from said wireless LAN system and clearing notification after clearing of a link between that wireless LAN system and said mobile terminal.

31. Exchange equipment that links a wireless LAN system and a mobile communication system, said exchange equipment comprising:
   a user information exchange section that exchanges user information between said mobile communication system and wireless LAN system;
   an authentication completion signal notification section that reports to said wireless LAN system an authentication completion signal sent from said mobile communication system according to an authentication request from said mobile terminal;
   an IP address notification section that reports from said wireless LAN system to said mobile communication system an IP address obtained after said mobile terminal establishes a link with said wireless LAN system; and
   a congestion status notification section that reports to said mobile communication system a congestion status in said wireless LAN system.

32. The exchange equipment according to claim 31, wherein said IP address notification section comprises a connection times detection section that detects a number of times of connection of said mobile terminal to said wireless LAN system according to a number of times of said IP address notification from said wireless LAN system to said mobile communication system.

33. The exchange equipment according to claim 31, wherein said IP address notification section reports to said mobile communication system a clearing notification sent from said wireless LAN system after a link between said mobile terminal and said wireless LAN system is cleared, and said IP address notification section comprises a connection time detection section that detects connection time of said mobile terminal to said wireless LAN system according to a time from said IP address notification from said wireless LAN system to said mobile communication system until said clearing notification.

34. The exchange equipment according to claim 31, wherein said authentication completion signal notification section comprises a connection times detection section that detects a number of times of connection of said mobile terminal to said wireless LAN system according to a number of times of notification of said authentication completion signal from said mobile communication system to said wireless LAN system.

35. A mobile terminal for communication with both a wireless LAN system and a mobile communication system, said mobile terminal comprising:
   a link establishment request section that requests a link with said wireless LAN system according to a request for establishment of a link with that wireless LAN system using a paging channel of said mobile communication system;
   an authentication request signal transmitting section that transmits a signal requesting said mobile communication system to perform authentication necessary at a time of establishment of a link with said wireless LAN system;
   an IP address notification section that reports to said mobile communication system an IP address obtained after establishment of a link with said wireless LAN system; and
   a communication path selection section that, when information is transmitted to an external terminal via said mobile communication system and wireless LAN system, selects a communication path either via said mobile communication system or via said wireless LAN system according to transmit data capacity of that information.

36. The mobile terminal according to claim 35, wherein said communication path selection section selects a communication path via said wireless LAN system when transmit data capacity of said information is greater than a predetermined value, and selects a communication path via said mobile communication system when transmit data capacity of said information is less than a predetermined value.

37. The mobile terminal according to claim 35, further comprising a congestion status receiving section that receives a congestion status of said mobile communication system and wireless LAN system; wherein said communication path selection section assesses a congestion status received by said congestion status receiving section and selects a communication path either via said mobile communication system or via said wireless LAN system.

38. The mobile terminal according to claim 35, further comprising:
   a communication path selection request signal transmitting section that transmits a signal giving transmit data capacity of said information and requesting of said mobile communication system selection of a communication path either via said mobile communication system or via said wireless LAN system;
   a communication path selection response signal receiving section that receives a communication path selection response signal sent back from said mobile communication system in response to said communication path selection request signal; and
   a communication path selection section that selects a communication path either via said mobile communication system or via said wireless LAN system according to a result of said communication path selection response signal.

39. A mobile communication system that is linked to a wireless LAN system that performs wireless communication with a mobile terminal of a wireless LAN area via exchange equipment, said mobile communication system comprising:
   a location information management section that manages as location information an IP address of said mobile terminal in said wireless LAN system obtained via said exchange equipment;
   a communication path selection section that, when there is a request for communication with said mobile terminal from an external terminal, selects a communication path either via that mobile communication system or via said wireless LAN system; and
   an IP address notification section that, when a communication path via said wireless LAN system is selected, reports to said external terminal an IP address of said mobile terminal in said location information management section.

40. The mobile communication system according to claim 39, wherein said communication path selection section, when there is a request for communication with an external terminal from said mobile terminal, selects a communication path either via that mobile communication system or via said wireless LAN system.

41. The mobile communication system according to claim 39, wherein said communication path selection section selects one or another said communication path according to a communication path request from said external terminal or a communication path request from said mobile terminal.

42. The mobile communication system according to claim 39, wherein said communication path selection section selects one or another said communication path according to transmit data capacity of information from said external terminal or transmit data capacity of information from said mobile terminal.

43. The mobile communication system according to claim 42, wherein said communication path selection section selects a communication path via said wireless LAN system when transmit data capacity of information from said external terminal or transmit data capacity of information from said mobile terminal is greater than a predetermined value, and selects a communication path via said mobile communication system when transmit data capacity of information from said external terminal or transmit data capacity of information from said mobile terminal is less than a predetermined value.

44. The mobile communication system according to claim 42, wherein said communication path selection section assesses a congestion status of a network managed by said mobile communication system and wireless LAN system, and selects one or another said communication path.

45. A communication method in an integrated wireless communication system comprising a wireless LAN system that performs wireless communication with a mobile terminal of a wireless LAN area and a mobile communication system linked to said wireless LAN system via exchange equipment, said communication method comprising the steps of:
registering an IP address assigned to said mobile terminal as location information when a link is established between said wireless LAN system and said mobile terminal;
receiving a request for communication with said mobile terminal from an external terminal or a request for communication with an external terminal from said mobile terminal;
determining whether there is a communication path request in said communication request;
selecting a communication path either via that mobile communication system or via said wireless LAN system according to said communication path request; and
reporting said mobile terminal IP address to said external terminal when a communication path via said wireless LAN system is selected.

46. A communication method in an integrated wireless communication system comprising a wireless LAN system that performs wireless communication with a mobile terminal of a wireless LAN area and a mobile communication system linked to said wireless LAN system via exchange equipment, said communication method comprising the steps of:
registering an IP address assigned to said mobile terminal as location information when a link is established between said wireless LAN system and said mobile terminal;
receiving a request for communication with said mobile terminal from an external terminal or a request for communication with an external terminal from said mobile terminal;
determining transmit data capacity of information from said external terminal or transmit data capacity of information from said mobile terminal;
selecting a communication path either via that mobile communication system or via said wireless LAN system according to that transmit data capacity; and
reporting said mobile terminal IP address to said external terminal when a communication path via said wireless LAN system is selected.

47. The communication method according to claim 46, wherein a communication path via said wireless LAN system is selected when said transmit data capacity is greater than a predetermined value, and a communication path via said mobile communication system is selected when said transmit data capacity is less than to a predetermined value.

48. The communication method according to claim 46, wherein a congestion status of a network managed by said mobile communication system and wireless LAN system is assessed when selecting one or another said communication path.

* * * * *